United States Patent
Kuze

(10) Patent No.: US 9,732,667 B2
(45) Date of Patent: Aug. 15, 2017

(54) EGR CONTROL METHOD OF INTERNAL COMBUSTION ENGINE

(71) Applicant: TOYOTA JIDOSHA KABUSHIKI KAISHA, Toyota-shi, Aichi-ken (JP)

(72) Inventor: Yasuhiro Kuze, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 78 days.

(21) Appl. No.: 14/803,514

(22) Filed: Jul. 20, 2015

(65) Prior Publication Data

US 2016/0025046 A1    Jan. 28, 2016

(30) Foreign Application Priority Data

Jul. 22, 2014   (JP) ................................. 2014-148964
Jun. 5, 2015    (JP) ................................. 2015-114825

(51) Int. Cl.
   *F02M 25/07*   (2006.01)
   *F02B 37/00*   (2006.01)
   (Continued)

(52) U.S. Cl.
   CPC .......... *F02B 37/001* (2013.01); *F02B 37/183* (2013.01); *F02D 41/005* (2013.01); *F02D 41/0065* (2013.01); *F02D 41/0082* (2013.01); *F02M 26/06* (2016.02); *F02M 26/38* (2016.02); *F02M 26/46* (2016.02); *F02M 26/48* (2016.02); *F02B 2037/122* (2013.01);
   (Continued)

(58) Field of Classification Search
   CPC .......... F02M 25/0744; F02M 25/0711; F02M 25/0712; F02M 25/0754; F02M 25/0748; F02B 37/183; F02B 37/001
   See application file for complete search history.

(56) References Cited

U.S. PATENT DOCUMENTS

2005/0028515 A1* 2/2005 Fukuma ................. F02M 26/42
                                                                 60/276
2005/0274366 A1* 12/2005 Sato .................... F02D 41/0065
                                                                 123/568.2
(Continued)

FOREIGN PATENT DOCUMENTS

JP       2007-247612 A       9/2007
JP       2007247612 A    *   9/2007
(Continued)

*Primary Examiner* — Patrick Maines
(74) *Attorney, Agent, or Firm* — Andrews Kurth Kenyon LLP

(57) ABSTRACT

The invention has an object to control an EGR amount accurately in transient time. An ECU switches EGR control to the one-valve EGR control and the both-valve EGR control based on a request EGR amount. When the EGR control is switched to the one-valve EGR control from the both-valve EGR control, an EGR valve of one bank is closed first. Next, during a time period until an opening degree restriction time period elapses after the EGR valve is closed, an opening degree of an EGR valve of the other bank is restricted to be smaller than a one-valve target opening degree. Subsequently, when the opening degree restriction time period elapses, restriction of the opening degree of the EGR valve is cancelled, and the opening degree of the EGR valve is changes to the one-valve target opening degree.

9 Claims, 7 Drawing Sheets

(51) Int. Cl.
*F02B 37/18* (2006.01)
*F02M 26/46* (2016.01)
*F02M 26/48* (2016.01)
*F02D 41/00* (2006.01)
*F02M 26/06* (2016.01)
*F02M 26/38* (2016.01)
*F02B 37/12* (2006.01)
*F02M 26/43* (2016.01)
*F02D 41/30* (2006.01)
*F02M 26/15* (2016.01)

(52) U.S. Cl.
CPC ......... *F02D 41/3064* (2013.01); *F02M 26/15* (2016.02); *F02M 26/43* (2016.02); *Y02T 10/144* (2013.01); *Y02T 10/42* (2013.01); *Y02T 10/47* (2013.01)

(56) References Cited

U.S. PATENT DOCUMENTS

| | | | |
|---|---|---|---|
| 2008/0060624 A1* | 3/2008 | Grandas | F02D 41/0065 123/568.12 |
| 2012/0023937 A1* | 2/2012 | Styles | F02M 26/42 60/605.2 |
| 2016/0146136 A1* | 5/2016 | Surnilla | F02D 17/02 123/568.21 |

FOREIGN PATENT DOCUMENTS

| | | |
|---|---|---|
| JP | 2008-075505 A | 4/2008 |
| JP | 2008075505 A * | 4/2008 |

\* cited by examiner

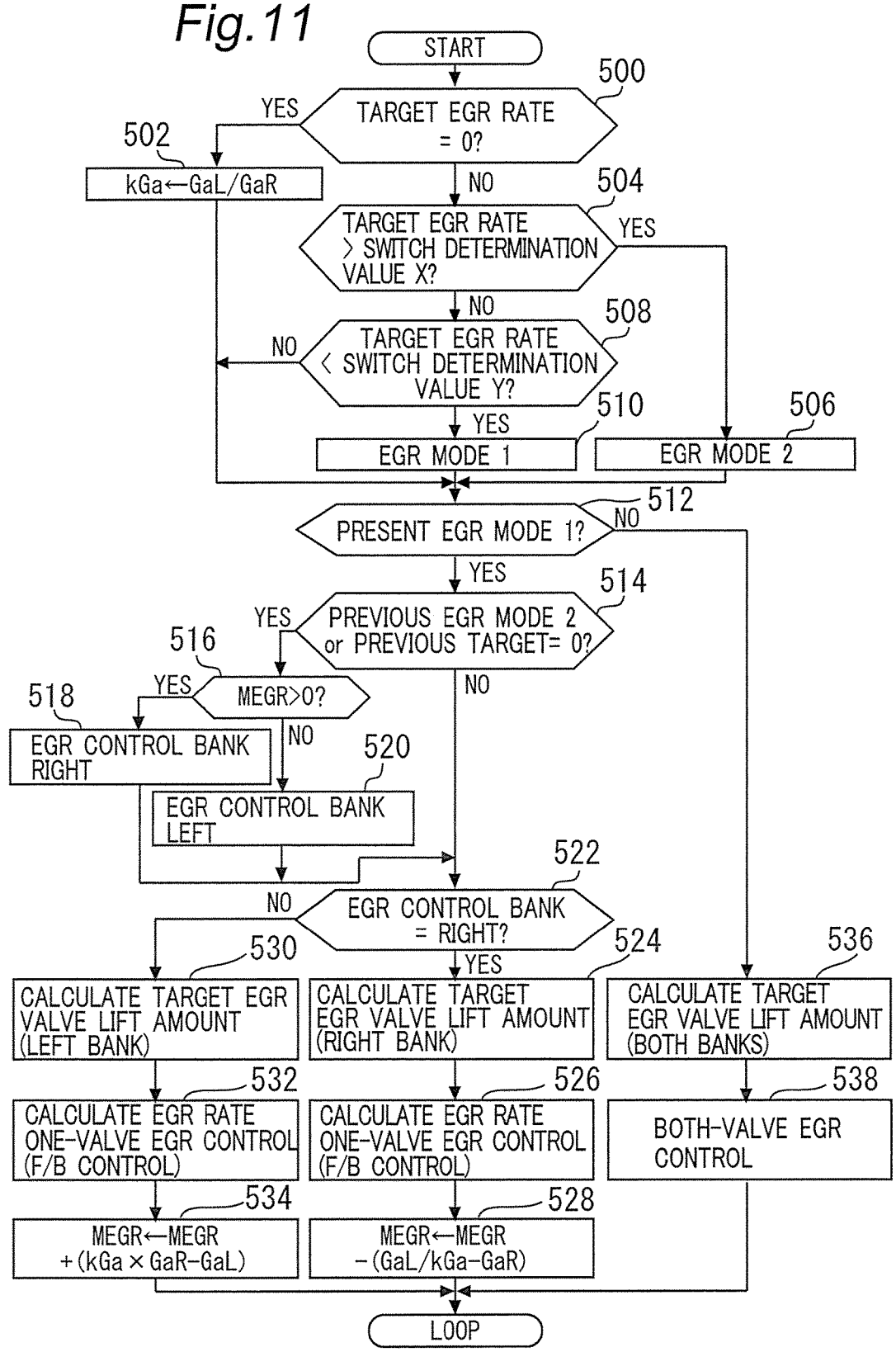

EGR CONTROL METHOD OF INTERNAL COMBUSTION ENGINE

CROSS-REFERENCE TO RELATED APPLICATIONS

The present application claims priority to Japanese Patent Application Nos. 2014-148964 filed on Jul. 22, 2014 and 2015-114825 filed on Jun. 5, 2015, which are incorporated herein by reference in their entireties.

BACKGROUND OF THE INVENTION

Field of the Invention

The present invention relates to an EGR control method of an internal combustion engine, and more particularly relates to an EGR control method of an internal combustion engine that performs EGR control respectively in two banks.

Background Art

As a prior art, there has been known a control device of an internal combustion engine including EGR mechanisms respectively in two banks as disclosed in Patent Literature 1 (Japanese Patent Laid-Open No. 2007-247612), for example. In the prior art, one-valve EGR control and both-valve EGR control are properly used by separately controlling EGR valves included by the respective banks. Thereby, in the prior art, a fresh air amount is increased while an EGR rate is compensated. Both-valve EGR control recirculates an EGR gas into an intake passage from exhaust systems of the respective banks by controlling both of opening degrees of the respective EGR valves. One-valve EGR control keeps one EGR valve of the EGR valves in an always closed state, and controls an opening degree of the other EGR valve in that state.

[Patent Literature 1]
Japanese Patent Laid-Open No. 2007-247612
[Patent Literature 2]
Japanese Patent Laid-Open No. 2008-75505

SUMMARY OF THE INVENTION

Technical Problem

In the prior art, when a request EGR amount which is generated in response to the operation state of the engine or the like (when the lift amount of the EGR valve is small), it is necessary to sufficiently ensure an allowance (a margin) of the target EGR amount relative to a deviation of the EGR amount. The allowance of the target EGR rate represents an allowable range in which a deviation of the implemented EGR rate relative to the target EGR amount is allowed in the engine control. As a control example of the prior art, a method is conceivable, that ensures the EGR amount by executing both-valve EGR control when the request EGR amount is large, and accurately executes EGR control by executing one-valve EGR control when the request EGR amount is small.

However, in the above-described control method, at the time of switch of the both-valve EGR control and one-valve EGR control, the EGR amount which remains in the closed EGR pipe cannot be grasped in the one-valve EGR control, for example. Therefore, in the prior art, excessive EGR is sometimes executed at the time of switch to both-valve EGR control from one-valve EGR control, and there arises a problem of causing troubles such as reduction in operability, and a misfire.

The present invention is made to solve the problem as above, and an object of the present invention is to provide an EGR control method of an internal combustion engine that can accurately control an amount of EGR flowing into cylinders, and restrain troubles such as reduction in operability and a misfire even in a control of properly using both-valve EGR control and one-valve EGR control in response to a request EGR amount or the like.

Means for Solving the Problem

A first aspect of the present invention is an EGR control method of internal combustion engine, comprising:
two banks sharing an intake passage with each other,
two EGR valves that are provided respectively at the two banks, and are capable of regulating amounts of EGR gases that are recirculated from exhaust systems of the respective banks to the intake passage, in the respective banks, and
a control device that individually controls the two EGR valves,
wherein when a request EGR amount is larger than a switch determination value, both-valve EGR control that controls both opening degrees of the respective EGR valves to recirculate the EGR gases to the intake passage from the exhaust systems of the respective banks, is executed by the control device;
when the request EGR amount is smaller than the switch determination value, one-valve EGR control that keeps one EGR valve of the respective EGR valves in an always closed state and controls an opening degree of the other EGR valve to a one-valve target opening degree in the state, is executed by the control device;
when the both-valve EGR control is switched to the one-valve EGR control, transient control is executed during a time period until the one-valve EGR control is started after the both-valve EGR control is ended; and
in the transient control, the one EGR valve is closed, and the other EGR valve is opened with an opening degree smaller than the one-valve target opening degree.

A second aspect of the present invention, wherein the control device has a function of executing a stoichiometric combustion mode of performing combustion with an air-fuel ratio corresponding to a theoretical air-fuel ratio, and a lean combustion mode of performing combustion at a leaner side than the theoretical air-fuel ratio, and
the both-valve EGR control is executed during the stoichiometric combustion mode, and the one-valve EGR control is executed during the lean combustion mode.

A third aspect of the present invention, wherein in the transient control
at a time of switching to the one-valve EGR control from the both-valve EGR control, a first process of closing the one EGR valve is executed,
during a time period until an opening degree restriction time period set in advance elapses after the one EGR valve is closed, a second process of restricting an opening degree of the other EGR valve to a transient one-valve target opening degree that is set to be smaller than the one-valve target opening degree is executed, and
when the opening degree restriction time period elapses, a third process of releasing restriction of the opening degree of the other EGR valve, and changing the opening degree of the other EGR valve to the one-valve target opening degree is executed.

A fourth aspect of the present invention, wherein the two banks each includes a turbocharger for turbocharging intake air by using an exhaust gas pressure, and a wastegate valve for controlling the exhaust gas pressure that is applied to the turbocharger, and at a time of execution of the one-valve EGR control, the wastegate valve of at least one of the banks is controlled so that rotational speeds of the turbochargers of the respective banks correspond to each other.

A fifth aspect of the present invention, wherein at the time of execution of the one-valve EGR control, intake air amounts of the respective banks are individually detected, and an amount of an EGR gas is calculated based on the intake air amounts of the respective banks.

A sixth aspect of the present invention, wherein intake air amounts of the respective banks are respectively detected in a state in which the both-valve EGR control and the one-valve EGR control are stopped, and a bank-to-bank intake air ratio that is a ratio of the intake air amounts of the respective banks is stored in advance, and at the time of execution of the one-valve EGR control, an amount of an EGR gas is calculated based on the intake air amounts detected respectively in the respective banks, and the bank-to-bank intake air amount ratio.

A seventh aspect of the present invention, wherein two kinds of bank-to-bank intake air amount ratios comprising the bank-to-bank intake air amount ratio in a natural aspiration region, and the bank-to-bank intake air amount ratio in a turbocharging region are respectively calculated and stored, and at the time of execution of the one-valve EGR control, either one of the two kinds of bank-to-bank intake air amount ratios is selected based on presence or absence of turbocharging, and the amount of the EGR gas is calculated by using the selected bank-to-bank intake air amount ratio.

An eighth aspect of the present invention, wherein at the time of execution of the one-valve EGR control, a calculation value of the EGR gas amount is corrected based on at least one temperature of a temperature of the EGR gas and an intake air temperature.

A ninth aspect of the present invention, wherein an integrated EGR amount obtained by integrating actual flowing amounts of the EGR gas is calculated for each of the banks, and at the time of execution of the one-valve EGR control, the EGR valve is closed in the bank where the integrated EGR amount is larger out of the two banks, and the EGR valve is driven in the bank where the integrated EGR amount is smaller.

Advantageous Effects of Invention

According to the first invention, the both-valve EGR control and the one-valve EGR control can be properly used in response to a target EGR rate (the request EGR amount). Thereby, the EGR control can be easily adapted to the system in which the request EGR amount can increase. Citing a specific example, in the operation mode in which the request EGR amount is large, for example, the both-valve EGR control is executed, and a sufficient amount of EGR gas can be ensured. Further, in the operation mode in which the request EGR amount is small, for example, the one-valve EGR control can be executed, and even in the region in which the target EGR amount is small, the EGR gas can be accurately controlled. Accordingly, the EGR control is precisely executed in a wide range from the region where the EGR amount is small to the region where the EGR amount is large, and fuel efficiency or the like can be improved. Further, according to the transient control, at the time of switch to the one-valve EGR control from the both-valve EGR control, the EGR amount of the other bank can be restricted, during the opening degree restriction time period in which discharge of the EGR gas remaining in the bank where the valve is closed is not completed. Thereby, the EGR amount is prevented from temporarily becoming excessively large due to the influence of the EGR gas remaining in the one bank, and a trouble such as a misfire can be restrained. Accordingly, at the time of switch of the EGR control, the EGR amount is accurately controlled, and a trouble such as a misfire can be restrained.

According to the second invention, in the stoichiometric combustion mode in which the request EGR amount is large, the both-valve EGR control is executed, and a sufficient amount of EGR gas can be ensured. Further, in the lean combustion mode in which the request EGR amount is small, for example, the one-valve EGR control can be executed, and even in the region where the target EGR amount is small, the EGR gas can be accurately controlled. Further, in the lean combustion mode, the EGR rate can be precisely controlled by using a part with which a deviation of the EGR amount hardly occurs, of the control characteristics of the EGR valve. Accordingly, the deviation of the EGR amount can be restrained.

According to the third invention, at the time of switch to the one-valve EGR control from the both-valve EGR control, the first to the third processes of the transient control can be sequentially executed. Thereby, the EGR amount can be prevented from temporarily becoming excessively large due to the influence of the EGR gas which remains in the one bank.

According to the fourth invention, the left and the right compressor flow rates can be caused to correspond to each other with higher precision. Thereby, calculation precision of the amount of the EGR gas is enhanced, and feedback control of the EGR can be executed more accurately.

According to the fifth invention, the actual amount of the EGR gas can be calculated by using the existing air flow sensor or the like without adding special sensors. Accordingly, feedback control of the EGR can be easily realized while increase in cost of the system is restrained.

According to the sixth invention, the structural factor which causes a difference between the left and the right compressor flow rates can be absorbed by the bank-to-bank intake air amount ratio. Thereby, in the one-valve EGR control, the actual amount of the EGR gas can be calculated more accurately by using the bank-to-bank intake air amount ratio.

According to the seventh invention, a state of the EGR gas which changes depending on whether it is the natural aspiration region or the turbocharging region can be reflected in the bank-to-bank intake air amount ratio. Accordingly, in the respective regions, the EGR rate can be calculated with higher precision.

According to the eighth invention, the temperature factor which causes a difference between the left and the right compressor flow rates can be reflected in the calculation valve of the amount of the EGR gas. Thereby, in the one-valve EGR control, the amount of the EGR gas can be calculated more accurately.

According to the ninth invention, the bank which is used at the time of execution of the one-valve EGR control can be properly selected based on the integrated amounts of the EGR gases which flow through the respective banks. Thereby, the integrated EGR amounts of the left and the right banks are equalized, and circulating the EGR gas in only one bank in an unbalanced way can be avoided.

BRIEF DESCRIPTION OF THE DRAWINGS

FIG. 11 is a flowchart showing control executed by the ECU in the sixth embodiment of the present invention.

DETAILED DESCRIPTION OF THE INVENTION

Hereinafter, embodiments of the present invention will be described with reference to the drawings. Note that when the numerals of the numbers, the quantities, the amounts, the ranges and the like of the respective elements are mentioned in the embodiments shown as follows, the numerals that are mentioned do not restrict the present invention, unless explicitly mentioned otherwise, or unless explicitly specified to the numerals theoretically. Further, the structures, the steps and the like that will be described in the embodiments shown as follows are not always essential to the invention unless explicitly mentioned otherwise, and unless explicitly specified to the structures, the steps and the like theoretically.

First Embodiment

[Configuration of the First Embodiment]

Figure 1:
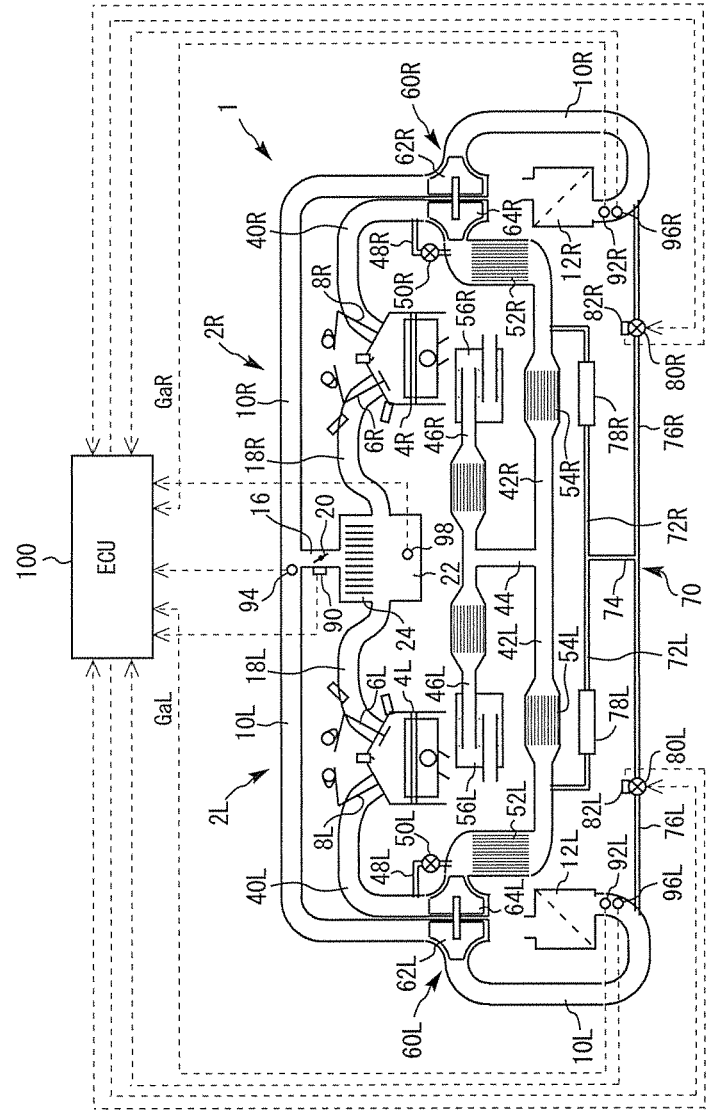
FIG. 1 is a configuration diagram for explaining a system configuration of an engine that is applied to a first embodiment of the present invention.

FIG. 1 is a configuration diagram for explaining a system configuration of an engine that is applied to a first embodiment of the present invention. A system of the present embodiment includes an engine 1 as an internal combustion engine. The engine 1 is a V-type engine having a left bank 2L and a right bank 2R. Note that FIG. 1 illustrates a cylinder 4L and a cylinder 4R for the respective banks. However, the present invention is applied to the internal combustion engine in which the respective banks have arbitrary numbers of cylinders. The engine 1 is a spark-ignition-type cylinder-direct-injection engine. In each of the cylinders of the engine 1, an ignition plug and a cylinder injection valve are disposed. Note that in the following explanation, the same components in the left bank 2L and the right bank 2R are described by affixing a letter of "L" or "R" to the same numerals respectively.

First, an intake system of the engine 1 will be described. An intake manifold 18L is connected to the cylinder 4L of the left bank 2L via an intake valve 6L. Further, an intake manifold 18R is connected to the cylinder 4R of the right bank 2R via an intake valve 6R. The left and right intake manifolds 18L and 18R are connected to a common surge tank 22. In the surge tank 22, a water-cooling-type intercooler 24 and a downstream intake pressure sensor 98 are disposed. The downstream intake pressure sensor 98 detects a pressure in the surge tank 22 at a downstream side of a throttle valve 20. To the surge tank 22, one downstream intake passage 16 is connected. In the downstream intake passage 16, the electronically-controlled-type throttle valve 20 is provided. The throttle valve 20 regulates an intake air amount. An opening degree of the throttle valve 20 is detected by a throttle opening degree sensor 90.

An upstream side of the downstream intake passage 16 is branched into two. The branched parts configure upstream intake passages 10L and 10R provided in the banks 2L and 2R respectively. That is to say, the downstream intake passage 16 configures an intake passage shared by the banks 2L and 2R. In a junction portion of the upstream intake passages 10L and 10R, an upstream intake pressure sensor 94 is disposed. The upstream intake pressure sensor 94 detects an intake pressure at an upstream side of the throttle valve 20. Air cleaners 12L and 12R, air flow sensors 92L and 92R, and intake temperature sensors 96L and 96R are disposed in upstream-side end portions of the upstream intake passages 10L and 10R. The air flow sensors 92L and 92R detect intake air amounts (fresh air amounts) respectively in the banks 2L and 2R. The intake air temperature sensors 96L and 96R detect intake air temperatures at upstream sides of compressors 62L and 62R respectively in the banks 2L and 2R.

Turbochargers 60L and 60R are loaded on the left and right banks 2L and 2R of the engine 1. Turbochargers 60L and 60R turbocharge intake air by using an exhaust gas pressure. In the left bank 2L, the compressor 62L of the turbocharger 60L is disposed in the upstream intake passage 10L. In the right bank 2R, the compressor 62R of the turbocharger 60R is disposed in the upstream intake passage 10R.

Next, an exhaust system of the engine 1 will be described. An exhaust manifold 40L is connected to the cylinder 4L of the left bank 2L via an exhaust valve 8L. A turbine 64L of the turbocharger 60L and a bypass passage 48L are provided in the exhaust manifold 40L. The bypass passage 48L bypasses the turbine 64L. Further, a wastegate valve 50L is disposed in the bypass passage 48L. The wastegate valve 50L is for controlling an exhaust gas pressure which is applied to the turbine 64L. Meanwhile, an exhaust manifold 40R is connected to the cylinder 4R of the right bank 2R via an exhaust valve 8R. A turbine 64R of the turbocharger 60R and a bypass passage 48R are provided in the exhaust manifold 40R. The bypass passage 48R bypasses the turbine 64R. Further, a wastegate valve 50R is disposed in the bypass passage 48R. The wastegate valve 50R is for controlling an exhaust gas pressure which is applied to the turbine 64R. Note that in the following explanation, the wastegate valve is sometimes described as "WGV".

In the left bank 2L, an exhaust passage 42L is connected to an outlet of the turbine 64L. Further, two catalysts 52L and 54L are provided in the exhaust passage 42L. In the right bank 2R, an exhaust passage 42R is connected to an outlet of the turbine 64R. Further, two catalysts 52R and 54R are provided in the exhaust passage 42R. The two exhaust passages 42L and 42R join each other to be one exhaust passage 44, which is branched again into two exhaust passages 46L and 46R under a floor of a vehicle. Mufflers 56L and 56R are disposed at downstream-side end portions of the exhaust passages 46L and 46R. The catalysts 52L and 52R and the catalysts 54L and 54R are configured by three-way catalysts or the like.

The engine 1 includes an EGR mechanism 70 that recirculates part of an exhaust gas to the intake system from the exhaust system as an EGR gas. The EGR mechanism 70 includes upstream EGR passages 72L and 72R, a midstream EGR passage 74, downstream EGR passages 76L and 76R, EGR coolers 78L and 78R, EGR valves 80L and 80R, and lift amount sensors 82L and 82R. In the left bank 2L, the upstream EGR passage 72L is connected to the exhaust passage 42L between the catalysts 52L and 54L. The upstream EGR passage 72L extracts an EGR gas from the exhaust passage 42L. The downstream EGR passage 76L is connected to the upstream intake passage 10L between the air cleaner 12L and the compressor 62L. The downstream EGR passage 76L causes the EGR gas to flow into the upstream intake passage 10L. The EGR valve 80L is disposed in the downstream EGR passage 76L. The EGR valve 80L regulates a flow rate of the EGR gas that flows into the upstream intake passage 10L from the downstream EGR passage 76L.

In the right bank 2R, the upstream EGR passage 72R is connected to the exhaust passage 42R between the catalysts 52R and 54R. The upstream EGR passage 72R extracts an EGR gas from the exhaust passage 42R. The downstream EGR passage 76R is connected to the upstream intake passage 10R between the air cleaner 12R and the compressor 62R. The downstream EGR passage 76R causes the EGR gas to flow into the upstream intake passage 10R. The EGR valve 80R is disposed in the downstream EGR passage 76R. The EGR valve 80R regulates a flow rate of the EGR gas that flows into the upstream intake passage 10R from the downstream EGR passage 76R. The midstream EGR passage 74 causes the upstream EGR passages 72L and 72R to join each other temporarily and branch into the downstream EGR passages 76L and 76R again thereafter. Note that in the following explanation, the flow rate of the EGR gas will be described as "the amount of the EGR gas" and "the EGR amount". A ratio of the amount of the EGR gas to a total amount of a gas flowing into the cylinder will be described as "an EGR rate".

The lift amount sensors 82L and 82R detect opening degrees (valve lift amounts) of the EGR valves 80L and 80R. Describing the lift amount sensor 82L of the left bank 2L first, when the EGR valve is configured by a butterfly valve, for example, a sensor that detects an opening degree (a rotational angle) of a butterfly valve is used as the lift amount sensor 82L. Further, when the EGR valve is configured by a poppet valve, a sensor that detects an angle of a cam that drives the poppet valve is used as the lift amount sensor 82L. The lift amount sensor 82R of the right bank 2R is configured similarly to the lift amount sensor 82L of the left bank 2L.

Next, a control system of the engine 1 will be described. The engine 1 includes a sensor system that detects operation information of the engine 1 and a vehicle, and an ECU (Electronic Control Unit) 100 that controls the engine 1. The sensor system includes an air-fuel ratio sensor, an accelerator pedal sensor, an engine speed sensor, an atmospheric pressure sensor and the like that are not illustrated, in addition to the aforementioned sensors 82L, 82R, 90, 92L, 92R, 94, 96L, 96R and 98 which are loaded on the engine 1 and the vehicle. The ECU 100 includes a storage circuit including a ROM, a RAM and a nonvolatile memory, a central processing unit (CPU), and an input/output port. The central processing unit performs arithmetic processing based on various control programs stored in the storage circuit.

The aforementioned sensor system is connected to an input side of the ECU 100. Various actuators loaded on the engine 1 and the vehicle are connected to an output side of the ECU 100. The actuators include an ignition device, a fuel injection device, a variable valve timing device and the like that are not illustrated, in addition to the throttle valve 20, the WGVs 50L and 50R and the EGR valves 80L and 80R. The ECU 100 executes various kinds of control based on inputs from the sensor system. The control includes two kinds of EGR control (one-valve EGR control and both-valve EGR control) that will be described later, and switch control and transient control of EGR.

(Both-Valve EGR Control)

Both-valve EGR control is EGR control that respectively controls opening degrees of both the EGR valves 80L and 80R of the respective banks 2L and 2R. At a time of execution of the both-valve EGR control, parts of the exhaust gases which flow in the exhaust passages 42L and 42R respectively become EGR gases to flow into the upstream EGR passages 72L and 72R. These EGR gasses sequentially flow through the EGR coolers 78L and 78R, the midstream EGR passage 74, the downstream EGR passages 76L and 76R and the EGR valves 80L and 80R, and are recirculated to the upstream intake passages 10L and 10R. Subsequently, these EGR gasses flow into the cylinders of the respective banks 2L and 2R via the downstream intake passage 16, the surge tank 22, and the intake manifolds 18L and 18R together with intake air (fresh air), and EGR is realized. At this time, the ECU 100 calculates a target EGR rate based on an operation state of the engine 1, and the like. Subsequently, the ECU 100 sets opening degrees (valve lift amounts) of both the EGR valves 80L and 80R in response to the calculated target EGR rates.

(One-Valve EGR Control)

One-valve EGR control is EGR control that brings one EGR valve of the two EGR valves 80L and 80R into an always fully closed state, and controls only an opening degree of the other EGR valve in this state. In the following explanation, one-valve EGR control that controls only the opening degree of the EGR valve 80L of the left bank 2L in a state in which the EGR valve 80R of the right bank 2R is fully closed will be described as "one-valve EGR control of the left bank". Further, one-valve EGR control that controls only the opening degree of the EGR valve 80R of the right bank 2R in a state in which the EGR valve 80L of the left bank 2L is fully closed will be described as "one-valve EGR control of the right bank". Note that in the following explanation, the one-valve EGR control of the left bank will be mainly illustrated, but the present invention may be applied to the one-valve EGR control of the right bank as a matter of course.

When the EGR valve 80L of the left bank 2L, for example, is opened in the one-valve EGR control, part of the exhaust gas flowing in the exhaust passage 42L becomes an EGR gas and flows into the upstream EGR passage 72L. Subsequently, the EGR gas flows through the EGR cooler 78L, the midstream EGR passage 74, the downstream EGR passage 76L and the EGR valve 80 in sequence, and is recirculated into the upstream intake passage 10L. Further, the EGR gas flows into the cylinders of the respective banks 2L and 2R via the downstream intake passage 16, the surge tank 22, and the intake manifolds 18L and 18R together with intake air, and EGR is realized. At this time, the ECU 100 calculates the target EGR rate based on the operation state of the engine 1 and the like. Subsequently, the ECU 100 sets the opening degree of the EGR valve 80L on the one side in response to the calculated target EGR rate.

Feature of First Embodiment

In general, an EGR valve is configured by a poppet valve. Therefore, an EGR valve has a characteristic that a change of the EGR amount relative to the opening degree is large in a region where the opening degree (the valve lift amount) is small. Here, the region where the opening degree of the EGR valve is small is a region where an opening area of the EGR valve is smaller than a sectional area of piping, for example. In the region where the opening degree is small, an influential force of the opening area to the flow rate of the EGR gas is large, and therefore, the EGR amount significantly changes by even a slight difference of the opening degree. Further, in the region where the opening degree of the EGR valve is small, a mechanical play existing in the EGR valve significantly influences the EGR amount. Accordingly, in the operation region where the opening degree of the EGR valve is small, a deviation of the EGR amount is easily generated, and therefore, it is necessary to control the opening degree of the EGR valve accurately while an allowance (a margin) for the deviation of the EGR amount is sufficiently ensured. Note that the allowance of the target EGR rate represents an allowable range in which even if the EGR rate under implementation deviates with respect to the target EGR amount, the deviation is allowed in engine control.

In relation to this, a method is also conceivable, which indirectly measures the EGR rate by the sensors such as an oxygen sensor and a temperature sensor, and performs feedback control of the opening degree of the EGR valve. However, this method causes increase in cost by addition of sensors and the like. Meanwhile, when the region where the target EGR amount is large is taken into consideration, a large valve device with a margin of flow rate, for example, is preferably adopted as the EGR valve. However, when a large EGR valve is adopted, the deviation of the EGR amount described above is likely to increase further in the region where the target EGR amount is small, and therefore, a larger margin is required. In particular, in the region where the target EGR rate is small, execution of the EGR control itself becomes difficult if a large margin is ensured by estimating the deviation of the EGR amount.

Figure 2:
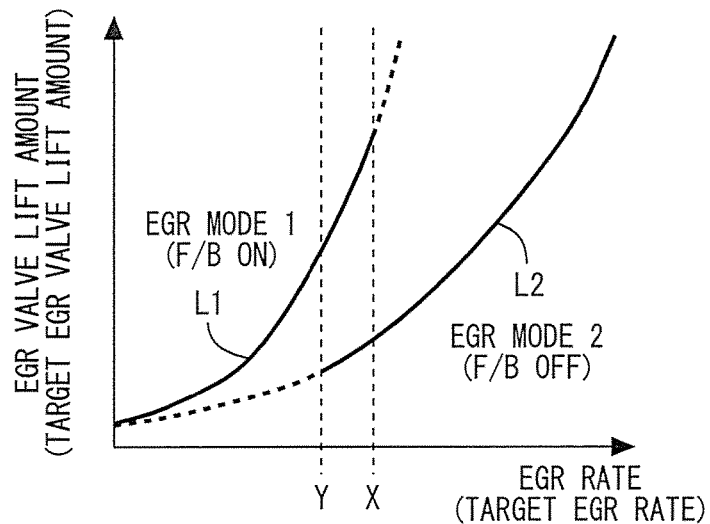
FIG. 2 is a characteristic chart showing a relation between the valve lift amount of the EGR valve and the EGR rate with respect to an EGR mode 1 and an EGR mode 2 that are used as the EGR control.

In order to solve the aforementioned problem, the present embodiment adopts a configuration that switches the both-valve EGR control and the one-valve EGR control based on the target EGR rate (or may be the target EGR amount) when EGR control is executed. FIG. 2 is a characteristic chart showing a relation between the valve lift amount of the EGR valve and the EGR rate with respect to an EGR mode 1 and an EGR mode 2 that are used as the EGR control. The EGR mode 1 refers to control of performing feedback control (F/B) of the valve lift amount of the EGR valve based on the EGR rate while executing the one-valve EGR control. Here, a characteristic line (a characteristic line L1 shown at a left side in FIG. 2) expressing the EGR mode 1 shows the relation between the valve lift amount at a time of the EGR valve on one side (for example, the EGR valve 80L) being driven, and the EGR rate.

Meanwhile, the EGR mode 2 refers to control of executing the both-valve EGR control. A characteristic line expressing the EGR mode 2 (a characteristic line L2 shown at a right side in FIG. 2) shows a relation between the valve lift amount at a time of both the EGR valves 80L and 80R being driven, and the EGR rate. Data expressing the characteristic lines L1 and L2 is stored in the ECU 100 in advance as a data map or the like. Note that in the EGR mode 2, a configuration that does not execute feedback control may be adopted as shown in FIG. 2.

As shown in FIG. 2, in the present embodiment, the EGR mode 1 is executed when the target EGR rate is smaller than a switch determination value Y. Further, when the target EGR rate is larger than a switch determination value X, the EGR mode 2 is executed. Here, the switch determination values X and Y are set in advance to correspond to a boundary value of an EGR amount suitable for the one-valve EGR control and an EGR amount suitable for the both-valve EGR control, and are stored in the ECU 100. The switch determination value X is set at a value larger than the switch determination value Y, and hysteresis is given to a switch timing of the EGR mode 1 and the EGR mode 2. Note that in the present invention, the switch determination values X and Y may be realized by a single switch determination value.

In the EGR mode 1, a target EGR valve lift amount is calculated from the target EGR rate based on the characteristic line L1 in FIG. 2. Subsequently, an actuator of the EGR valve 80L on the one side is driven so that the calculated target EGR valve lift amount is realized. At this time, the other EGR valve 80R is kept in a fully closed state. Further, in the EGR mode 2, the target EGR valve lift amount is calculated from the target EGR rate based on the characteristic line L2 in FIG. 2. Subsequently, actuators of the respective EGR valves 80L and 80R are respectively driven so that the calculated target EGR valve lift amount is realized.

According to the above-described control, when the target EGR rate is larger than the switch determination value X, that is, when the request EGR amount is large, the both-valve EGR control (the EGR mode 2) can be selected as the EGR control. Thereby, even in the system in which the request EGR amount can increase, a large amount of EGR gas can be supplied to the respective banks 2L and 2R. Accordingly, EGR control can be easily adapted to the region where the request EGR amount is large and the region where the request EGR amount is small. Further, the EGR rate is controlled by the two EGR valves 80L and 80R, and therefore, variable ranges of the valve lift amounts required from the individual EGR valves can be made small. Thereby, in the EGR control, a time period necessary for change of the valve lift amount can be reduced. Accordingly, the EGR rate is changed quickly, and responsiveness of control can be enhanced.

When the target EGR rate is smaller than the switch determination value Y, that is, when the request EGR amount is small, only the EGR valve 80L on one side can be controlled by the one-valve EGR control (the EGR mode 1). Thereby, in the EGR mode 1, the EGR gas can be supplied to the respective banks 2L and 2R by using the single EGR valve 80L. As a result, in the individual EGR valves 80L and 80R, the EGR rate can be controlled precisely based on a control characteristic in which a ratio of change of the EGR rate relative to change of the lift amount of the EGR valve is small (that is, the characteristic line L1 with a large gradient), as shown in FIG. 2. Accordingly, a deviation of the EGR amount can be restrained.

Further, in the EGR mode 1, control precision of the EGR rate can be further enhanced according to the following method. Describing more specifically, in the EGR mode 1, the EGR rate (and the EGR amount) is calculated by an equation of mathematical expression 1 described as follows. Subsequently, feedback control of the valve lift amount of the EGR valve 80L is performed so that the actual calculated EGR rate corresponds to the target EGR rate. The EGR rate during the one-valve EGR control can be expressed by the equation of mathematical expression 1. Note that the equation exemplifies the one-valve EGR control of the left bank.

$$\text{EGR rate} = \text{GaEGR}/(\text{GaR} + \text{GaL} + \text{GaEGR}) \quad \text{[Mathematical expression 1]}$$

In the above-described equation, GaL and GaR respectively represent fresh air amounts of the left bank 2L and the right bank 2R, and are individually detected by the air flow sensors 92L and 92R. Further, GaEGR represents the EGR amount. Here, when it is set as a precondition that the amounts of gases (hereinafter, described as left and right compressor flow rates) passing through the left and right compressors 62L and 62R are equal to each other, an equation of mathematical expression 2 described as follows is established. As a result, the equation of mathematical expression 1 described above can be rewritten as an equation of mathematical expression 3 described as follows.

$$\text{GaR} = \text{GaL} + \text{GaEGR} \quad \text{[Mathematical expression 2]}$$

$$\text{EGR rate} = (\text{GaR} - \text{GaL})/(\text{GaR} \times 2) \quad \text{[Mathematical expression 3]}$$

In the one-valve EGR control, an actual EGR rate is calculated by the equation of mathematical expression 3 described above, and feedback control of the EGR rate is executed. According to the control, the actual EGR rate can be calculated by using the existing air flow sensors 92L and 92R without adding special sensors. Accordingly, feedback control of the EGR rate in the EGR mode 1 can be easily realized while increase of the cost of the system is restrained.

Note that the EGR rate in the one-valve EGR control of the right bank is derived by exchanging GaL and GaR in the equation of mathematical expression 3 described above. Further, the left and right compressor flow rates are generally designed to be equal to each other under the condition that the left and right exhaust gas pressures are equal. Therefore, the precondition of the equation of mathematical expression 2 described above can be regarded as being established. However, when the EGR rate is calculated more accurately with a variation or the like of the components taken into consideration, control of corresponding rotational speeds of the left and right turbochargers 60L and 60R may be executed as in a third embodiment that will be described later.

(Control at Mode Switching Time)

As described above, when the target EGR rate becomes larger than the switch determination value X, the EGR control is switched to the EGR mode 2 from the EGR mode 1. In this case, according to one example shown in the present embodiment, the opening degree of the EGR valve 80L is changed to an opening degree corresponding to the EGR mode 2, and the EGR valve 80R is opened from a closed state. At this time, if both the EGR valves 80L and 80R are opened simultaneously, the EGR rate is likely to be temporarily excessively large. Therefore, in the present embodiment, switch control shown in FIG. 3 is executed.

Figure 3:
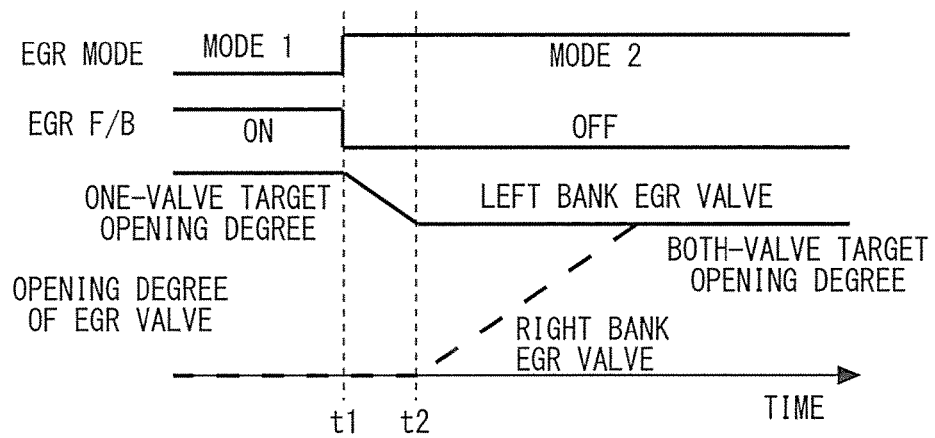
FIG. 3 is a timing chart showing switch control to the EGR mode 2 from the EGR mode 1 in the first embodiment of the present invention.

FIG. 3 is a timing chart showing switch control to the EGR mode 2 from the EGR mode 1 in the first embodiment of the present invention. In the drawing, "EGR F/B" represents an execution state of the feedback control of the EGR rate. Further, in the opening degree of the EGR valve, a solid line shows the opening degree of the EGR valve 80L of the left bank 2L, and a dotted line shows the opening degree of the EGR valve 80R of the right bank 2R. Further, a one-valve target opening degree refers to a target opening degree of the EGR valve 80L in the one-valve EGR control. A both-valve target opening degree refers to a target opening degree of the EGR valves 80L and 80R in the both-valve EGR control.

In the switch control shown in FIG. 3, first of all, in a time point t1, determination to switch the mode of the EGR control to the EGR mode 2 from the EGR mode 1 is established. Thereby, feedback control of the EGR rate which is executed in the EGR mode 1 is stopped at the time point t1. Subsequently, during a time period from the time point t1 to a time point t2, the opening degree of the EGR valve 80L which is opened in the EGR mode 1 is changed to the both-valve target opening degree from the one-valve target opening degree. At this time, the EGR gas which is supplied from the single EGR valve 80L is supplied from the two EGR valves 80L and 80R, and therefore, the both-valve target opening degree is set at a value smaller than the one-valve target opening degree. Next, at the time point t2 at which change of the opening degree of the EGR valve 80L is completed, the EGR valve 80R which is closed in the EGR mode 1 is opened, and the opening degree of the EGR valve 80R is gradually changed to the both-valve target opening degree from zero.

According to the switch control shown in FIG. 3, in the state in which the EGR valve 80L is opened to a larger extent than the both-valve target opening degree, the EGR valve 80R can be prevented from opening. Thereby, excessive increase of the EGR amount at the time of start of the both-valve EGR control is avoided, and a trouble such as a misfire can be restrained. Accordingly, switch to the EGR mode 2 from the EGR mode 1 can be smoothly executed.

(Transient Control at a Time of Switch of EGR Mode 2→EGR Mode 1)

Figure 4:
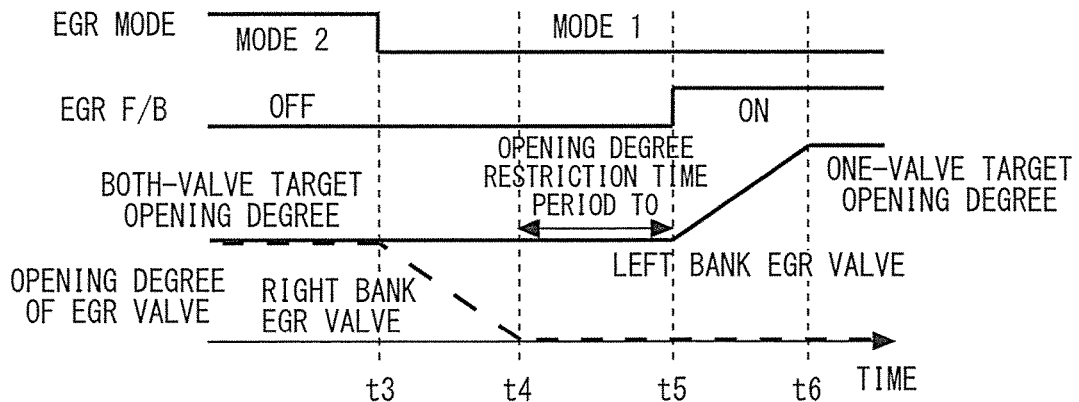
FIG. 4 is a timing chart showing transient control that is executed at a time of switch to the EGR mode 1 from the EGR mode 2.

Next, with reference to FIG. 4, transient control that is executed at a time of switch to the EGR mode 1 from the EGR mode 2 will be described. FIG. 4 is a timing chart showing transient control that is executed at a time of switch to the EGR mode 1 from the EGR mode 2. Respective items shown in the drawing are similar to those in FIG. 3. In the transient control shown in FIG. 4, the target EGR rate becomes lower than the switch determination value Y first at a time point t3, and determination to switch the mode of the EGR control to the EGR mode 1 from the EGR mode 2 is established. Thereby, in the transient control, during a time period from the time point t3 to a time point t4, the EGR valve 80R is fully closed in a state in which the opening degree of the EGR valve 80L is kept at the both-valve target opening degree.

However, at the time point t4, the EGR gas remains in a channel portion at a downstream side from the EGR valve 80R of a channel of the EGR gas, because the EGR valve 80R is opened just before the time point t4. The channel portion includes a part of the downstream EGR passage 76R, the upstream intake passage 10R, the downstream intake passage 16, the surge tank 22, the intake manifold 18R and the like. If the opening degree of the EGR valve 80L is increased to be larger than the both-valve target opening degree in this state, the EGR amount becomes excessively large by the EGR gas increased in the left bank 2L and the EGR gas remaining in the right bank 2R.

Therefore, in the transient control, the opening degree of the EGR valve 80L is restricted to be equal to or smaller than a transient one-valve target opening degree that will be described later, in an opening degree restriction time period T0 from the time point t4 to a time point t5. Here, the opening degree restriction time period T0 corresponds to a time period necessary for the EGR gas remaining in the right bank 2R, for example, to be discharged to the exhaust system, and is set in advance by an experiment or the like. Note that the opening degree restriction time period T0 may be configured to be changed based on the engine speed, the intake air amount and the like, for example. The transient one-valve target opening degree is an opening degree for restricting the EGR amount in the opening degree restriction time period T0 in which the remaining EGR gas flows in from the right bank 2R to a proper amount. The transient one-valve target opening degree is set at an opening degree smaller than the one-valve target opening degree. FIG. 4 illustrates the case of setting the transient one-valve target opening degree and the both-valve target opening degree to be equal to each other, but in the present invention, both of them do not have to be set as equal to each other.

As above, in the transient control, in the time period until the opening degree restriction time period T0 elapses after the EGR valve 80R is closed, the opening degree of the EGR valve 80L is restricted to be equal to or smaller than the transient one-valve target opening degree. Subsequently, in the transient control, at the time point t5 when the opening degree restriction time period T0 elapses, restriction of the opening degree of the EGR valve 80L is cancelled, and the opening degree is gradually changed to the both-valve target opening degree from the transient one-valve target opening degree. Further, at the time point t5, the transient control is ended, and feedback control of the EGR rate by the EGR mode 1 is started. In the feedback control, the EGR rate is calculated on the precondition that the EGR amount of the right bank 2R is zero as shown in the equation of mathematical expression 2 described above. Therefore, the EGR valve 80R is preferably closed quickly from the time point t1 at which determination of mode switch is established. Further, the feedback control of the EGR rate is preferably started from the time point t3 at which the EGR gas remaining in the right bank 2R is discharged.

According to the above-described transient control, during the opening degree restriction time period T0 in which discharge of the EGR gas remaining in the one bank 2R is not completed, the EGR amount of the other bank 2L can be restricted to be a value smaller than the EGR amount which is suited to the one-valve EGR control. That is to say, according to the transient control, an operation of increasing the opening degree of the EGR valve 80L can be delayed until discharge of the remaining EGR gas is completed. Thereby, the EGR amount can be prevented from temporarily becoming excessively large due to an influence of the remaining EGR gas. Further, during an opening degree restriction time period T0, the feedback control of the EGR rate can be prohibited. Accordingly, switch can be made smoothly to the EGR mode 1 from the EGR mode 2.

[Specific Processes for Realizing First Embodiment]

Figure 5:
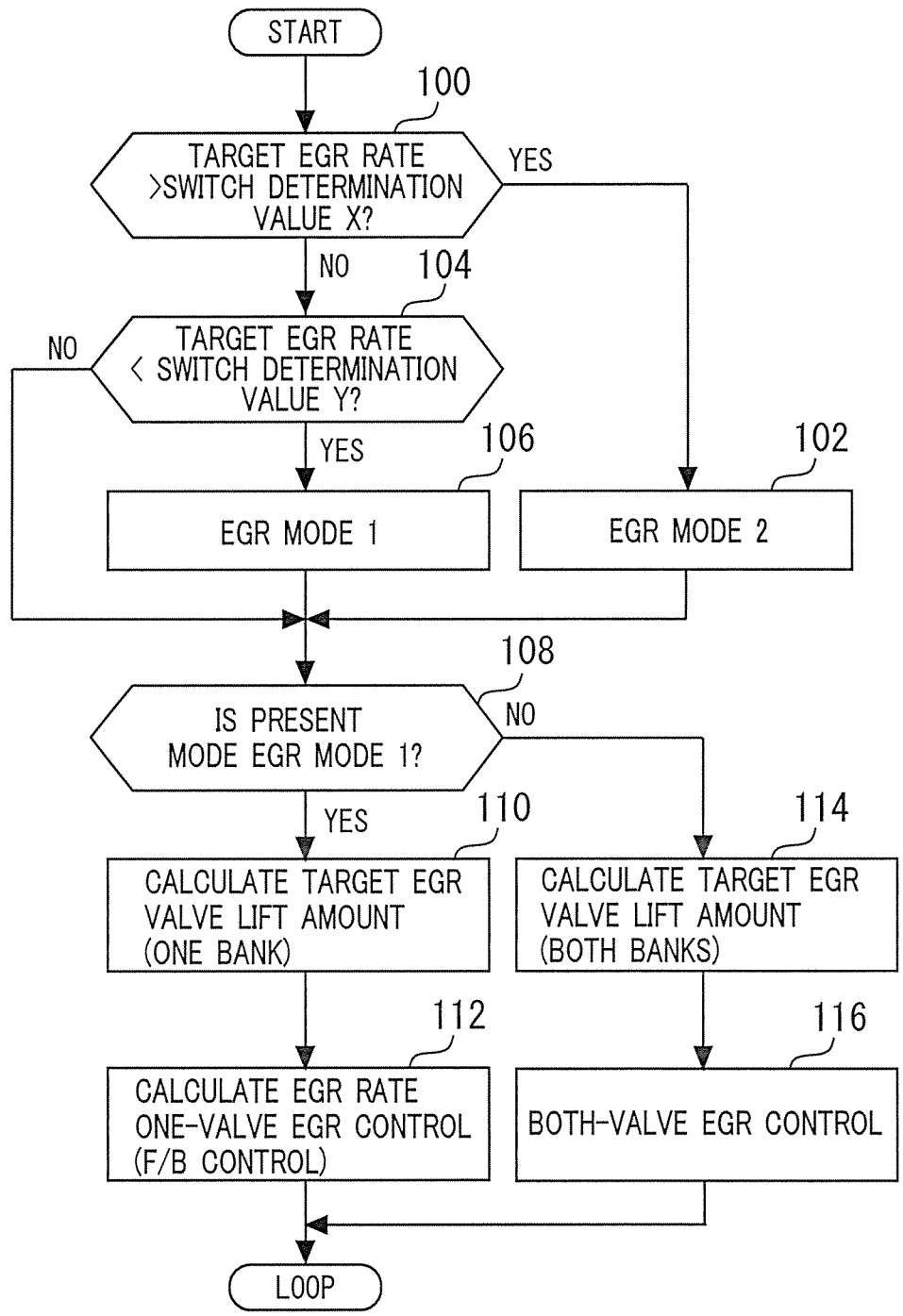
FIG. 5 is a flowchart showing the modes of the EGR control which are executed by the ECU in the first embodiment of the present invention.

Next, with reference to FIG. 5, specific processes for realizing the aforementioned control will be described. FIG. 5 is a flowchart showing the modes of the EGR control which are executed by the ECU in the first embodiment of the present invention. In a routine shown in FIG. 5, it is firstly determined whether or not the target EGR rate calculated based on the operation information of the engine 1 is larger than the switch determination value X, in step 100. When the determination is established, it is determined that the EGR control mode is the EGR mode 2 in step 102, and the flow shifts to step 108.

When the determination in step 100 is not established, the flow shifts to step 104, and it is determined whether or not the target EGR rate is smaller than the switch determination value Y. When the determination in step 104 is established, it is determined that the EGR control mode is the EGR mode 1 in step 106, and the flow shifts to step 108. When the determination in step 104 is not established, the flow shifts to step 108 without determining the mode of the EGR control.

Next, in step 108, it is determined whether or not the present mode is the EGR mode 1. When the determination in step 108 is established, the flow shifts to step 110, and the target EGR valve lift amount which is used in the one bank is calculated. Subsequently, in step 112, the one-valve EGR control is executed. Further, the actual EGR rate is calculated by the equation of mathematical expression 3 described above, and feedback control of the valve lift amount is performed so that the actual EGR rate corresponds to the target EGR rate.

When the determination in step 108 is not established, the flow shifts to step 114, and the target EGR valve lift amount which is used in both the banks is calculated. Subsequently, in step 116, the both-valve EGR control is executed. Further, after the processes in steps 112 and 116 are executed, the processes in steps 100 through 116 are repeated until the condition for ending the present routine is established.

As above, according to the above-described control, the EGR amount can be controlled without using a part where the deviation of the EGR amount easily occurs (for example, a dotted line portion at the left side, which has a gentle gradient, in the characteristic line L2 shown in FIG. 2) in the characteristic lines of the EGR valves 80L and 80R. Thereby, the EGR control can be precisely executed in a wide range from a region with a small EGR amount to a region with a large EGR amount while the EGR amount is sufficiently ensured. Accordingly, fuel efficiency and the like can be improved.

Second Embodiment

Next, a second embodiment of the present invention will be described with reference to FIGS. 6 to 10. A feature of the present embodiment lies in that the control described in the aforementioned first embodiment is applied to a lean combustion engine. Note that in the present embodiment, the same components as in the first embodiment are assigned with the same reference signs, and explanation thereof will be omitted. Further, explanation of the same terms will also be omitted.

In the present embodiment, the ECU 100 is configured to use a stoichiometric combustion mode and a lean combustion mode properly based on the operation state of the engine 1. The stoichiometric combustion mode is for performing combustion control in a range of an air-fuel ratio including a theoretical air-fuel ratio. The lean combustion mode is for performing combustion control in a range of an air-fuel ratio (for example, a lean air-fuel ratio of around 18 to 24) which is at a leaner side than the theoretical air-fuel ratio. When EGR control is performed in these combustion modes, the following problem arises.

In general, when the EGR control is performed in the lean combustion mode, the target EGR rate is set to be small, and therefore, the opening degree of the EGR valve is also controlled to be small in correspondence with this. In the region where the opening degree of the EGR valve is small like this, there arises the problem that a deviation of the EGR amount easily occurs, due to the characteristics of the poppet valve and the like as described above. In particular, during the lean combustion mode, the target EGR rate is small, and therefore, if a large margin is ensured on the assumption of the deviation of the EGR amount, execution of the EGR control itself becomes difficult. Meanwhile, in the stoichiometric combustion mode, there is the demand to change the EGR amount to a large extent quickly in response to acceleration, deceleration and the like of the engine. However, with a large-sized EGR valve, the deviation of the EGR amount easily becomes larger in the region where the opening degree in the lean combustion mode is small.

Figure 6:
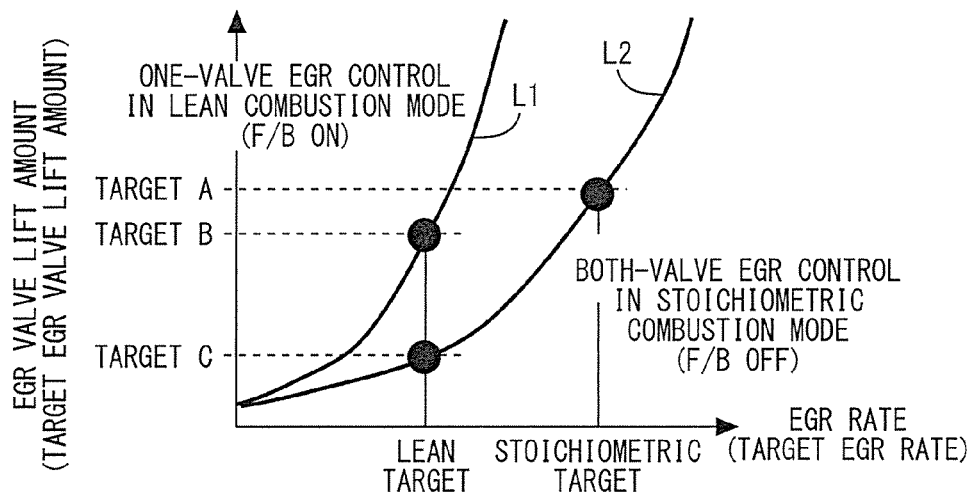
FIG. 6 is a characteristic diagram showing a relation between the valve lift amount of the EGR valve and the EGR rate, with respect to the stoichiometric combustion mode and the lean combustion mode in the second embodiment of the present invention.

In order to solve the problem as above, in the present embodiment, both-valve EGR control is executed during the stoichiometric combustion mode, and one-valve EGR control is executed during the lean combustion mode. FIG. 6 is a characteristic diagram showing a relation between the valve lift amount of the EGR valve and the EGR rate, with respect to the stoichiometric combustion mode and the lean combustion mode in the second embodiment of the present invention. The characteristic lines L1 and L2 illustrated in the drawing are substantially similar to those in the aforementioned first embodiment. That is to say, the characteristic line L1 at the left side shows a relation between the valve lift amount at the time of the EGR valve on one side (for example, the EGR valve 80L) being driven, and the EGR rate. Further, the characteristic line L2 at the right side shows a relation between the valve lift amount at the time of both the EGR valves 80L and 80R being driven, and the EGR rate. Data expressing the characteristic lines L1 and L2 is stored in the ECU 100 in advance as a data map or the like.

(Stoichiometric Combustion Mode)

In the stoichiometric combustion mode, both-valve EGR control is executed. Describing more specifically, during the stoichiometric combustion mode, the target EGR rate is set at a stoichiometric target in FIG. 6 based on the operation state of the engine. Further, the target EGR valve lift amounts of the respective EGR valves 80L and 80R are set at a target A corresponding to the stoichiometric target, based on the characteristic line L2 for the both-valve EGR control. Subsequently, the ECU 100 drives the actuators of the respective EGR valves 80L and 80R so that the target EGR valve lift amounts are realized. Note that in the stoichiometric combustion mode, a configuration that does not execute feedback control may be adopted as shown in FIG. 6.

(Lean Combustion Mode)

In the lean combustion mode, feedback control of the valve lift amount of the EGR valve is performed based on the EGR rate while one-valve EGR control is executed. During the lean combustion mode, the target EGR rate is set at a lean target in FIG. 6 based on the operation state of the engine. Further, the target EGR valve lift amount of the EGR valve on one side which is opened is set at a target B corresponding to the lean target based on the characteristic line L1 for one-valve EGR control. Subsequently, the ECU 100 drives the actuator of the EGR valve 80L, for example, so that the target EGR valve lift amount is realized.

In general, the stoichiometric target of the EGR rate is set to be larger than the lean target. Therefore, the target A for the stoichiometric combustion mode (for the both-valve EGR control) is set at an opening degree larger than the target B for the lean combustion mode (for the one-valve EGR control). Further, a target C in FIG. 6 is a target EGR valve lift amount at a transient time, which is used in transient control that will be described later. The target C is set as the target EGR valve lift amount which is calculated from the lean target, based on the characteristic line L2 for the stoichiometric combustion mode, for example. That is to say, the target C is a valve lift amount for realizing the EGR rate (the lean target) which is to be realized by the single EGR valve, by the two EGR valves 80L and 80R, and therefore is set to be an opening degree smaller than the target B for the lean combustion mode.

According to the aforementioned control, in a system that switches the stoichiometric combustion mode and the lean combustion mode, an effect similar to the effect of the aforementioned first embodiment can be obtained. That is to say, in the stoichiometric combustion mode in which the request EGR amount is large, a large amount of EGR gas can be supplied to the respective banks 2L and 2R by the both-valve EGR control. Thereby, in the system in which the request EGR amount can increase, the EGR control can be easily adapted to both the stoichiometric combustion mode in which the request EGR amount is large, and the lean combustion mode in which the request EGR amount is small. Further, variable ranges of the valve lift amounts which are required from the individual EGR valves are made small, and responsiveness of the EGR control can be enhanced. In particular, in the stoichiometric combustion mode, if a negative pressure occurs at a time of deceleration or the like, the EGR amount is likely to be excessively large by being sucked by the negative pressure. In this case, a function of quickly stopping the EGR control is required, and the function can be satisfied by enhancement of responsiveness.

In the lean combustion mode in which the request EGR amount is small, only the EGR valve 80L on one side is controlled by the one-valve EGR control, and the EGR gas can be supplied to the left bank 2L. Accordingly, in the lean combustion mode, in the region where the opening degree of the EGR valve is small (in particular, the region where the open area of the EGR valve is smaller than the sectional area of the piping as described above), the one-valve EGR control can be executed, as shown in FIG. 6. In this region, the EGR amount easily changes significantly even with a slight change of the opening degree of the EGR valve. Accordingly, in this region, the EGR rate is controlled based on the characteristic line L1 in FIG. 6 with a large gradient, that is, the characteristic line L1 in which the ratio of the change of the EGR rate relative to the change of the opening degree is small. Thereby, in the lean combustion mode, the deviation of the EGR amount is restrained by the one-valve EGR control, and the EGR amount can be controlled with high precision.

However, in the above-described control, it is difficult to grasp the EGR amounts of the respective banks at the time of switch of the lean combustion mode and the stoichiometric combustion mode. Therefore, at the time of switch of the combustion mode, the EGR amount is likely to increase beyond expectation to cause a trouble such as a misfire, and there arises the problem of difficulty in controlling the EGR valve while avoiding such a trouble. Therefore, in the present embodiment, when the combustion mode is switched between the stoichiometric combustion mode and the lean combustion mode, switch control and transient control that will be described as follows are executed.

(Control at Mode Switching Time)

Figure 7:
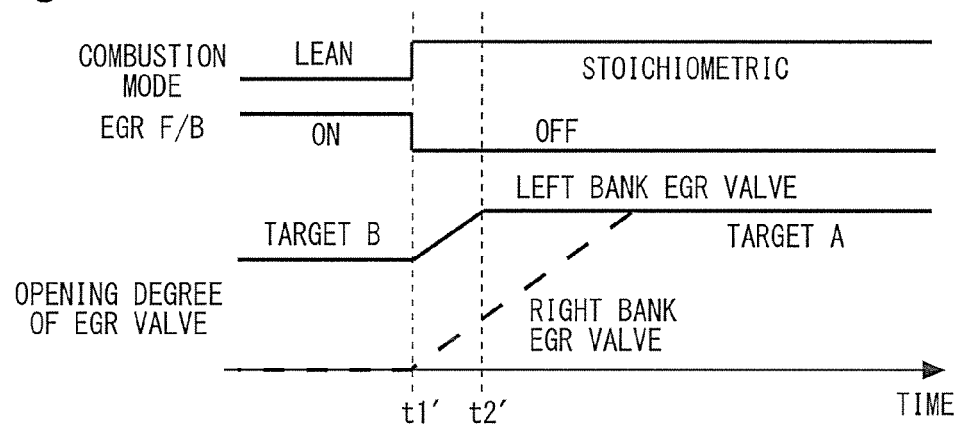
FIG. 7 is a timing chart showing switch control to the stoichiometric combustion mode from the lean combustion mode.

FIG. 7 is a timing chart showing switch control to the stoichiometric combustion mode from the lean combustion mode. In the switch control shown in FIG. 7, at a time point t1', determination to switch to the stoichiometric combustion mode from the lean combustion mode is established first. Thereby, the feedback control of the EGR rate which is executed during the lean combustion mode is stopped at the time point Subsequently, during a time period from the time point t1' to a time point t2', the opening degree of the EGR valve 80L which is opened during the lean combustion mode is changed to the target A for the stoichiometric combustion mode from the target B. Further, at the time point t1', the EGR valve 80R which is fully closed during the lean combustion mode is opened, and the opening degree of the EGR valve 80R is gradually changed to the target A from zero.

According to the switch control shown in FIG. 7, at a time of switch to the stoichiometric combustion mode from the lean combustion mode, the opening degrees of the respective EGR valves 80L and 80R can be changed quickly from the time point t1' at which the determination of mode switch is established. Thereby, fuel efficiency and exhaust emission in the stoichiometric combustion mode can be kept favorable. Accordingly, switch to the stoichiometric combustion mode from the lean combustion mode can be smoothly executed.

Figure 8:
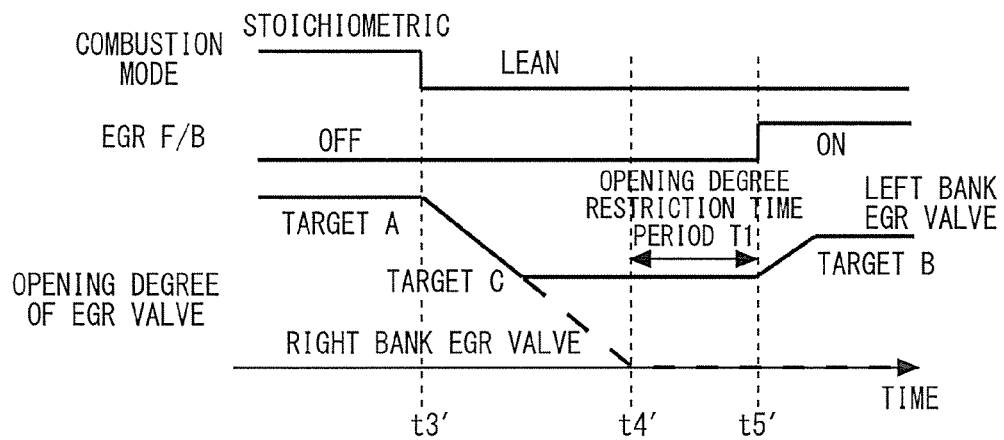
FIG. 8 is a timing chart showing transient control that is executed at a time of switch to the lean combustion mode from the stoichiometric combustion mode, in the second embodiment of the present invention.

FIG. 8 is a timing chart showing transient control that is executed at a time of switch to the lean combustion mode from the stoichiometric combustion mode, in the second embodiment of the present invention. Respective items shown in the drawing are similar to the items in FIG. 7. In the transient control shown in FIG. 8, at a time point t3', determination to switch the combustion mode to the lean combustion mode from the stoichiometric combustion mode is established first. Thereby, during a time period from the time point t3' to a time point t4', the opening degree of the EGR valve 80L is decreased to the target C from the target A for the stoichiometric combustion mode, and the EGR valve 80R is fully closed.

However, in the time point t4', the EGR valve 80R is opened just before the time point t4', and therefore, the EGR gas remains in a channel portion at a downstream side from the EGR valve 80R in the channel of the EGR gas. The channel portion includes a part of the downstream EGR passage 76R, the upstream intake passage 10R, the downstream intake passage 16, the surge tank 22, the intake manifold 18R and the like. If the opening degree of the EGR valve 80L is increased to the target B for the lean combustion mode in this state, the EGR amount becomes excessively large by the EGR gas which is increased in the left bank 2L and the EGR gas which remains in the right bank 2R.

Therefore, the opening degree of the EGR valve 80L is restricted to an opening degree equal to or smaller than the target C which is set in advance, during an opening degree restriction time period T1 from the time point t4' to a time point t5'. Here, the opening degree restriction time period T1 corresponds to a time period necessary for the EGR gas remaining in the right bank 2R, for example, to be discharged to the exhaust system, and is set in advance by an experiment or the like. Note that the opening degree restriction time period T1 may be configured to be changed based on the engine speed, the intake air amount and the like, for example. Further, the target C is an opening degree for restricting the EGR amount in the opening degree restriction time period T1 in which the remaining EGR gas is recirculated from the right bank 2R, to a proper amount.

Note that in the present embodiment, the target C corresponds to the transient one-valve target opening degree, and the target B corresponds to one-valve target opening degree. Further, FIG. 8 illustrates the case of restricting the opening degree of the EGR valve 80L to be equal to or smaller than the target C, throughout the time period until the opening degree restriction time period T1 elapses before the time point t4'. However, in the present invention, the opening degree of the EGR valve 80L can be restricted to be equal to or smaller than the target C at least during the opening degree restriction time period T1. That is to say, in the present invention, the time period in which the opening degree of the EGR valve is restricted to be equal to or smaller than the target C may be equal to the opening degree restriction time period T1.

As above, during the time period until the opening degree restriction time period T1 elapses after the EGR valve 80R is closed, the opening degree of the EGR valve 80L is restricted to be equal to or smaller than the target C. Subsequently, at the time point t5' when the opening degree restriction time period T1 elapses, restriction of the opening degree of the EGR valve 80L is cancelled, and the opening degree is gradually changed to the target B for the lean combustion mode from the target C at the transient time. Further, at the time point t5', feedback control of the EGR rate by the one-valve EGR control is started.

The above-described feedback control is executed on the precondition that the EGR amount of the right bank 2R is zero. Therefore, the EGR valve 80R is preferably closed quickly from the time point t3' at which determination of mode switch is established, and the feedback control of the EGR rate is preferably started from the time point t5' at which the EGR gas remaining in the right bank 2R is discharged.

According to the transient control shown in FIG. 8, a substantially similar effect to that in the case of the transient control shown in FIG. 4 described above can be obtained. That is to say, during the opening degree restriction time period T1 in which discharge of the EGR gas remaining in the one bank 2R is not completed, the EGR amount of the other bank 2L can be restricted to be a value smaller than the EGR amount which is suited to the lean combustion mode (the one-valve EGR control). Thereby, the EGR amount can be prevented from temporarily becoming excessively large due to an influence of the remaining EGR gas, and a trouble such as a misfire can be restrained. Further, during the opening degree restriction time period T1, the feedback control of the EGR rate can be prohibited. Accordingly, switch can be made smoothly to the lean combustion mode from the stoichiometric combustion mode.

[Specific Processes for Realizing Second Embodiment]

Figure 9:
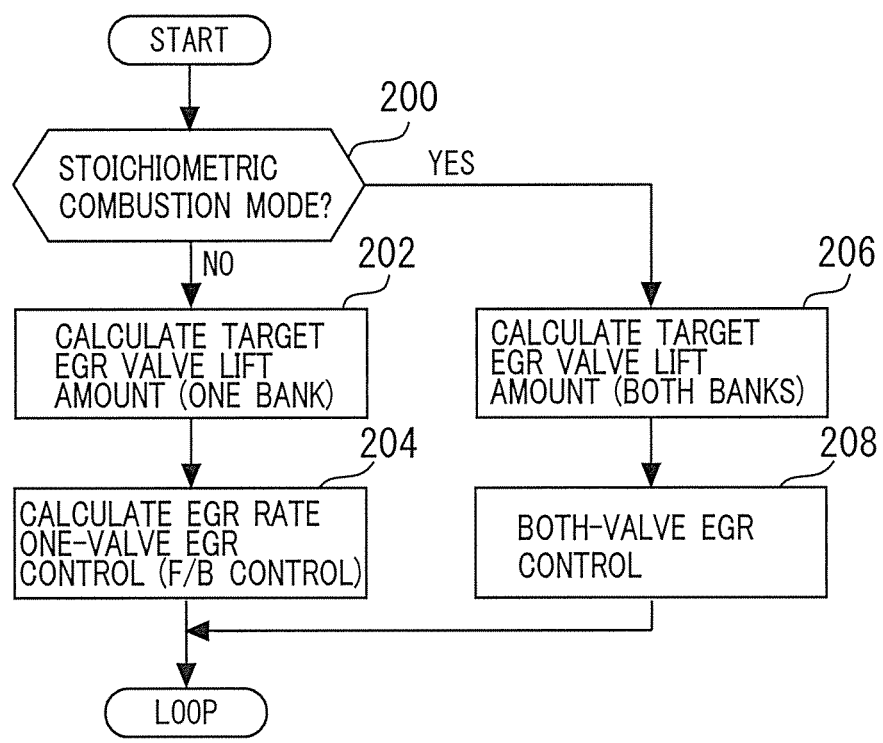
FIG. 9 is a flowchart showing the modes of the combustion control which are executed by the ECU in the second embodiment of the present invention.

Next, with reference to FIGS. 9 and 10, specific processes for realizing the aforementioned control will be described. First, FIG. 9 is a flowchart showing the modes of the combustion control which are executed by the ECU in the second embodiment of the present invention. In a routine shown in FIG. 9, it is firstly determined whether or not a present combustion mode is a stoichiometric combustion mode in step 200. When the determination is not established, the flow shifts to step 202, and the target EGR valve lift amount which is used in one bank is calculated. Subsequently, in step 204, the one-valve EGR control is executed. Further, the actual EGR rate is calculated by the equation of mathematical expression 3 described above, and feedback control of the valve lift amount is performed so that the EGR rate corresponds to the target EGR rate.

When the determination in step 200 is established, the flow shifts to step 206, and the target EGR valve lift amount which is used in both the banks is calculated. Subsequently, in step 208, the both-valve EGR control is executed. Further, after the processes in steps 204 and 208 are executed, the processes in steps 200 to 208 are repeated until the condition for ending the present routine is established.

As above, according to the processes shown in FIG. 9, the one-valve EGR control and the both-valve EGR control can be properly used in accordance with the combustion mode. Thereby, EGR control is executed precisely in a wide range from the region where the EGR amount is small to the region where the EGR amount is large while the EGR amount is sufficiently ensured, and fuel efficiency and the like can be improved.

Figure 10:
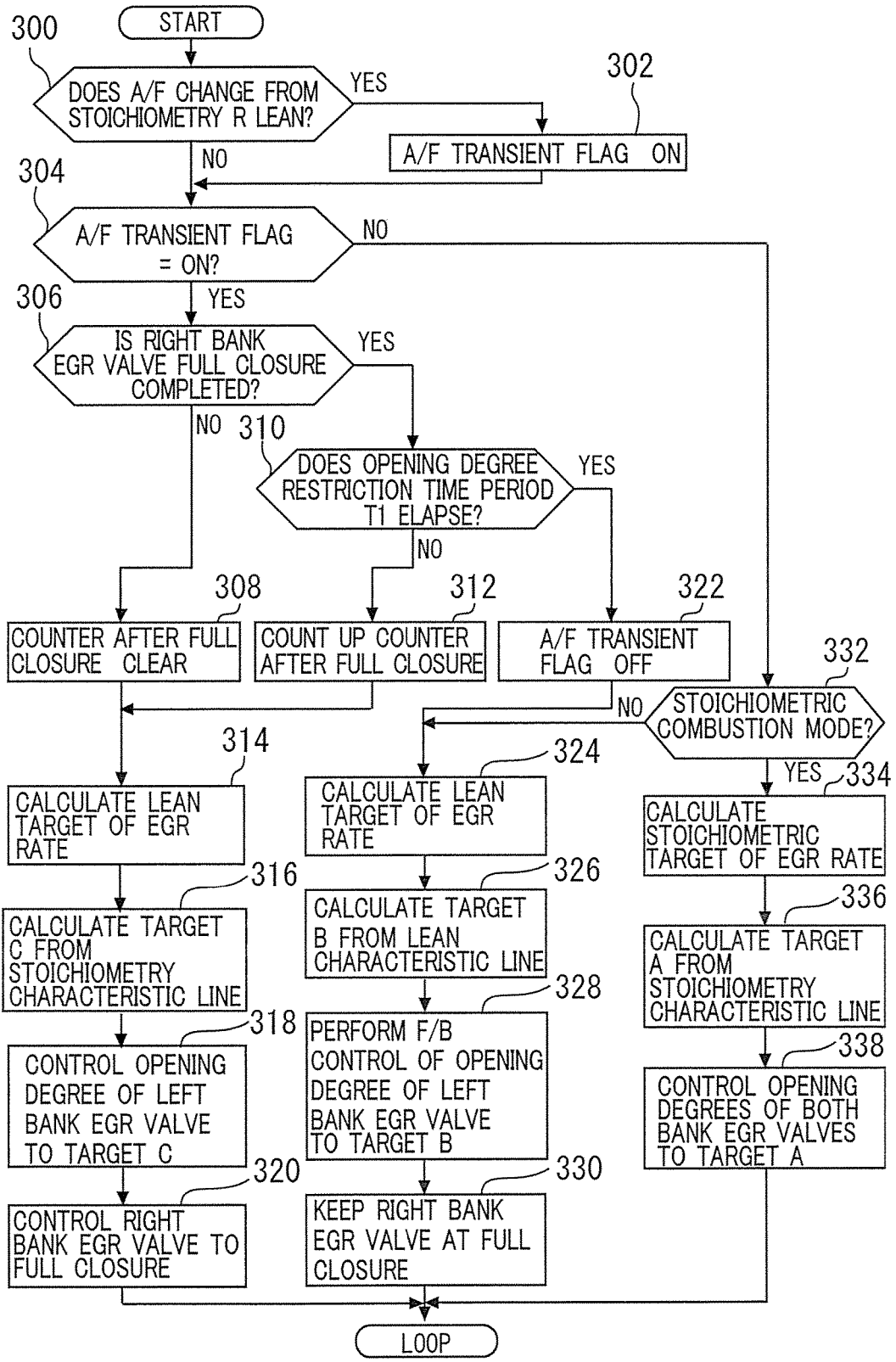
FIG. 10 is a flowchart showing switch control to the lean combustion mode from the stoichiometric combustion mode which is executed by the ECU in the second embodiment of the present invention.

Next, FIG. 10 is a flowchart showing switch control to the lean combustion mode from the stoichiometric combustion mode which is executed by the ECU in the second embodiment of the present invention. In a routine shown in FIG. 10, it is firstly determined whether or not the A/F changes to lean from stoichiometry, in step 300. The determination determines whether or not the combustion mode is switched to the lean combustion mode from the stoichiometric combustion mode. When the determination in step 300 is established, it is a timing at which the combustion mode is switched to the lean combustion mode. Therefore, an A/F transient flag is set at ON in step 302, and the flow shifts to step 304. When the determination in step 300 is not established, the flow directly shifts to step 304.

Next, in step 304, it is determined whether or not the A/F transient flag is set at ON. When the determination in step 304 is established, the flow shifts to step 306, and it is determined whether or not an operation of fully closing the EGR valve at the one bank (for example, the EGR valve 80R of the right bank 2R) is completed. The determination is executed based on the detection result of the lift amount sensor 82R of the right bank 2R. When the determination in step 306 is not established, the operation of closing the EGR valve on one side is underway (between the time points t3' and t4' shown in FIG. 8). In this case, the flow shifts to step 308, and a counter after full closure for measuring the opening degree restriction time period T1 is cleared to zero, after which, the flow shifts to step 314.

When the determination in step 306 is established, the flow shifts to step 310, and it is determined whether or not the opening degree restriction time period T1 elapses after the EGR valve of the one bank is fully closed, based on the value of the counter after full closure. When the determination in step 310 is not established, the time is in the time period in which the opening degree restriction time period T1 does not elapse after the EGR valve of the one side is fully closed (between the time point t4' and the time point t5' shown in FIG. 8). In this case, the flow shifts to step 312, and the counter after full closure is counted up, after which, the flow shifts to step 314.

Next, in step 314, the target EGR rate (the lean target in FIG. 6) for the lean combustion mode is calculated. Subsequently, in step 316, the target EGR valve lift amount (the target C) is calculated from the lean target, based on the characteristic line L2 for the stoichiometric combustion mode as described above. In step 318, the opening degree of the EGR valve which is not closed (for example, the EGR valve 80L of the left bank 2L) is controlled to the target C.

Further, in step 320, the EGR valve 80R of the right bank 2R is controlled to be fully closed (kept to be fully closed when already fully closed).

When the determination in step 310 is established, the control reaches the time point t5' in FIG. 8, and the opening degree restriction time period T1 elapses. Therefore, the flow shifts to step 322, and the A/F transient flag is cleared to be OFF. Subsequently, by processes in steps 324 to 330, the one-valve EGR control is executed. That is to say, in step 324, the lean target of the EGR rate is calculated. In step 326, the target EGR valve lift amount (the target B) is calculated from the lean target, based on the characteristic line L1 for the lean combustion mode as described above. Subsequently, in step 328, feedback control of the opening degree of the EGR valve 80L is performed so that the opening degree of the EGR valve 80L corresponds to the target B. Further, in step 330, the EGR valve 80R which is already fully closed is continuously kept in a fully closed state.

Further, when the determination in step 304 is not established, the A/F transient flag is cleared to be OFF, and therefore, the fuel mode is in a steady state. In this case, the flow shifts to step 332, and it is determined whether or not the present combustion mode is a stoichiometric combustion mode. When the determination in step 332 is established, the both-valve EGR control is executed by processes in steps 334 to 338. That is to say, in step 334, the stoichiometric target of the EGR rate is calculated. In step 336, the target EGR valve lift amount (the target A) is calculated from the stoichiometric target based on the character line L2 for the stoichiometric combustion mode shown in FIG. 6. Subsequently, in step 338, the opening degrees of the EGR valves 80L and 80R of both the banks 2L and 2R are controlled to the target A.

When the determination in step 332 is not established, the present combustion mode is the lean combustion mode, and therefore, the one-valve EGR control is executed by the processes in steps 324 to 330 described above. Further, after the processes in steps 320, 330 and 338 are executed, the processes in steps 300 to 338 are repeated until the condition for ending the present routine is established.

As described in detail above, according to the present embodiment, when the combustion mode is switched between the stoichiometric combustion mode and the lean combustion mode, the EGR amount is accurately controlled, and a trouble such as a misfire can be restrained. Accordingly, an effect similar to the effect of the aforementioned first embodiment can be obtained. In the present embodiment, steps 320 and 330 in FIG. 10 show a specific example of the first process. Further, steps 314 to 318 show a specific example of the second process, and steps 324 to 328 show a specific example of the third process. Further, in the lean combustion mode, the configuration may be adopted, which performs feedback control of the valve lift amount of the EGR valve 80L by using the equations of mathematical expressions 1 to 3, similarly to the aforementioned first embodiment. Further, in the present embodiment, control of causing the rotational speeds of the left and right turbochargers 60L and 60R to correspond to each other may be executed as in a third embodiment that will be described later.

Third Embodiment

Next, a third embodiment of the present invention will be described. The present embodiment controls the WGV of at least one bank so that the rotational speeds of the turbochargers of the respective banks correspond to each other at the time of executing one-valve EGR control, in the aforementioned first and second embodiments. The present embodiment shows a calculation method for calculating the EGR rate with high precision in this state. Note that the present embodiment is predicated on a configuration similar to the aforementioned first embodiment (FIG. 1), and explanation of the same terms and reference signs as in the first embodiment will be omitted.

In the engine 1, the EGR rate is calculated on the precondition that the left and the right compressor flow rates are equal as described above. Therefore, if a difference occurs to the rotational speeds of the left and right turbochargers 60L and 60R due to manufacturing tolerances, deterioration or the like of the WGVs 50L and 50R, for example, a difference also occurs to the left and right compressor flow rates, and calculation precision of the EGR rate is reduced. Therefore, in the present embodiment, at least one of the WGVs 50L and 50R is controlled so that the rotational speeds of the turbochargers 60L and 60R correspond to each other, when the one-valve EGR control is executed.

Citing a specific example, in the present embodiment, turbine rotational speed sensors that individually detect the rotational speeds of the respective turbochargers 60L and 60R, for example, are provided at the left and the right banks 2L and 2R. The opening degree of the WGV (for example, the WGV 50L) of the bank in which the rotational speed of the turbocharger 60L or 60R is high out of the respective banks 2L and 2R is increased more than the opening degree of the other WGV 50R, and the rotational speeds of the respective turbochargers 60L and 60R are caused to correspond to each other.

According to the control, the left and the right compressor flow rates can be caused to correspond to each other with higher precision. Thereby, the calculation precision of the EGR rate which is calculated based on the equation of mathematical expression 3 described above is enhanced, and the feedback control of the EGR rate can be executed more accurately. When electrically driven compressors are used as the turbochargers, the rotational speeds of the compressors may be caused to correspond to each other by controlling the voltages, the currents and the like which are supplied to the respective compressors.

Fourth Embodiment

Next, a fourth embodiment of the present invention will be described. The present embodiment shows a calculation method that learns a difference in an air flow rate ratio between the two banks and uses the learning result in calculation of the EGR rate (and the EGR amount) in the aforementioned first and second embodiments. Note that the present embodiment is predicated on a configuration similar to the configuration of the aforementioned first embodiment, and explanation of the same terms and reference signs as in the first embodiment will be omitted.

A difference between the left and the right compressor flow rates may occur due to a structural difference between the banks 2L and 2R. As the structural difference, for example, a difference of the shapes of the upstream intake passages 10L and 10R, the intake manifolds 18L and 18R, or the like, a difference of the contamination degrees of the air cleaners 12L and 12R, a difference of the manufacturing tolerances, the contamination degrees, or the deterioration degrees of the WGVs 50L and 50R and the like are cited. In the present embodiment, in order to absorb the differences as above, learning control of a bank-to-bank intake air amount ratio is executed.

In the learning control, first of all, fresh air amounts GaR0 and GaL0 of the respective banks 2L and 2R are respectively detected in a state in which both-valve EGR control and one-valve EGR control are stopped. Subsequently, a bank-to-bank intake air amount ratio kGa that is a ratio of the fresh air amounts GaR0 and GaL0 is calculated from an equation of mathematical expression 4 described as follows. The calculated bank-to-bank intake air amount ratio kGa is stored in the ECU 100 as a learning value.

$$kGa = GaL0/GaR0 \quad \text{[Mathematical expression 4]}$$

At a time of execution of the one-valve EGR control, the EGR rate is calculated by an equation in mathematical expression 5 described as follows based on the fresh air amounts GaR and GaL which are detected during the EGR control, and the bank-to-bank intake air amount ratio kGa which is a learning value. The equation exemplifies the one-valve EGR control of the left bank.

$$\text{EGR rate} = (kGa \times GaR - GaL)/\{CaR \times (1+kGa)\} \quad \text{[Mathematical expression 5]}$$

The equation in mathematical expression 5 is derived as follows based on the equation of mathematical expression 1 described in the aforementioned first embodiment. First, the bank-to-bank intake air amount ratio kGa shown in the equation in mathematical expression 4 described above is generated due to an individual difference between the respective banks 2L and 2R. Therefore, in a state in which the one-valve EGR control of the left bank is executed, for example, an equation of mathematical expression 6 described as follows is considered to be established with respect to the bank-to-bank intake air amount ratio kGa. Here, a denominator of the equation of mathematical expression 6 represents the fresh air amount of the right bank 2R, and a numerator of the equation of mathematical expression 6 represents (fresh air amount of the left bank 2L+EGR amount). When the equation of mathematical expression 6 is modified, an equation of mathematical expression 7 described as follows can be obtained. Subsequently, "GaEGR" shown by the equation of mathematical expression 7 is substituted into the denominator and the numerator in the equation of mathematical expression 1 described above, whereby the equation of mathematical expression 5 described above can be derived.

$$kGa = (GaL + GaEGR)/GaR \quad \text{[Mathematical expression 6]}$$

$$GaEGR = kGa \times GaR - GaL \quad \text{[Expression 7]}$$

In the one-valve EGR control of the right bank, an equation of mathematical expression 8 described as follows is established with respect to the bank-to-bank intake air amount ratio kGa. Accordingly, by substituting the equation into the equation of mathematical expression 1 described above, a calculation formula of the EGR rate is derived as an equation of mathematical expression 9 described as follows.

$$kGa = GaL/(GaR + GaEGR) \quad \text{[Mathematical expression 8]}$$

$$\text{EGR rate} = (GaL/kGa - GaR)/\{GaL \times (1+1/kGa)\} \quad \text{[Mathematical expression 9]}$$

As above, according to the present embodiment, the bank-to-bank intake air amount ratio kGa is calculated in advance in a state in which the EGR control is stopped, whereby a structural factor that causes a difference in the left and right compressor flow rates can be absorbed. Thereby, in the one-valve EGR control, the actual EGR rate can be calculated more accurately by using the bank-to-bank intake air amount ratio kGa. Accordingly, not only the EGR rate can be easily calculated by using the existing air flow sensors 92L and 92R, but also the calculation precision of the EGR rate can be enhanced as compared with the equation of mathematical expression 3 described above.

Further, the above-described learning control may adopt a configuration that prepares the bank-to-bank intake air amount ratios kGa individually for a natural aspiration region without performing turbocharging, and a turbocharging region. Describing in more detail, the ECU 100 individually calculates two kinds of bank-to-bank intake air amount ratios constituted of a bank-to-bank intake air amount ratio kGa1 in the natural aspiration region and a bank-to-bank intake air amount ratio kGa2 in the turbocharging region in the respective regions, and stores calculation results. Subsequently, at the time of execution of the one-valve EGR control, the ECU 100 selects either the bank-to-bank intake air amount ratio kGa1 or kGa2 as the bank-to-bank intake air amount ratio kGa, and calculates the EGR rate by using the bank-to-bank intake air amount ratio kGa.

Describing more specifically, when the intake air pressure detected by the downstream intake air pressure sensor 98 is lower than an atmospheric pressure, the ECU 100 determines that the natural aspiration is underway, and calculates the EGR rate by the equation of mathematical expression 5 or mathematical expression 9 described above, by using the bank-to-bank intake air amount ratio kGa1 in the natural aspiration region. When the intake air pressure is higher than the atmospheric pressure, the ECU 100 determines that turbocharging is underway, and calculates the EGR rate by using the bank-to-bank intake air amount ratio kGa2 in the turbocharging region.

According to the control, a state of the EGR gas which changes depending on whether the natural aspiration region or the turbocharging region can be reflected in the bank-to-bank intake air amount ratios kGa1 and kGa2. Accordingly, in the respective regions, the EGR rates can be calculated with higher precision. Note that when the EGR rate is calculated by the method described in the present embodiment, the rotational speeds of the left and right turbochargers 60L and 60R are preferably caused to correspond to each other by using the method described, for example, in the third embodiment or the like.

Fifth Embodiment

Next, a fifth embodiment of the present invention will be described. The present embodiment shows a calculation method that reflects an influence of a temperature when the EGR rate (and the EGR amount) is calculated in the aforementioned first and second embodiments. Note that the present embodiment is predicated on a configuration similar to the configuration of the aforementioned first embodiment, and explanation of the same terms and reference signs as in the first embodiment will be omitted.

In the aforementioned fourth embodiment, the structural factors which reduce the calculation precision of the EGR rate are described. Besides the above factors, in the case of the intake air temperature increasing due to mixing of the EGR gas, for example, the efficiency of the compressors 62L and 62R is reduced to cause a difference between the left and right compressor flow rates, and an error sometimes occurs to the calculation result of the EGR rate. Therefore, in the present embodiment, the EGR rate is calculated based on the intake air temperatures at the upstream sides of the compressors 62L and 62R (hereinafter, described as the intake air temperatures before the compressors), or the temperature of the EGR gas. Note that in the following explanation, a calculation process that is executed during the one-valve EGR control of the left bank will be illustrated.

In general, the efficiency of the compressors 62L and 62R is inversely proportional to an intake air temperature (an absolute temperature). Therefore, when a flow rate ratio of a compressor flow rate QL of the left bank 2L and a compressor flow rate QR of the right bank 2R is set as kTH, the flow rate ratio kTH (=QL/QR) can be expressed as in an equation of mathematical expression 10 described as follows based on an intake air temperature THL before the compressor of the left bank 2L and an intake air temperature THR before the compressor of the right bank 2R. During the one-valve EGR control of the left bank, the EGR gas does not flow through the right bank 2R, and therefore, an intake air temperature THa is equal to the intake air temperature THR before the compressor of the right bank 2R. Accordingly, the flow rate ratio kTH can also be expressed as a right side of mathematical expression 10 as described as follows.

$$kTH=QL/QR=THR/THL=THa/THL \quad \text{[Mathematical expression 10]}$$

Considering the temperature difference between the left and the right banks, the compressor flow rate QL of the left bank 2L can be expressed as $(kTH \times GaR)$ based on the aforementioned flow rate ratio kTH, and the fresh air amount GaR of the right bank 2R. As a result, in the one-valve EGR control of the left bank, the EGR gas amount obtained by subtracting the fresh air amount GaL of the left bank 2L from the compressor flow rate QL of the left bank 2L is expressed as an equation of mathematical expression 11 described as follows.

$$GaEGR=QL-GaL=kTH \times GaR-GaL \quad \text{[Mathematical expression 11]}$$

The equation of mathematical expression 11 which is obtained as above is substituted into the calculation formula (the equation of mathematical expression 1) of the EGR rate described above, whereby an equation of mathematical expression 12 described as follows can be obtained.

$$EGR\text{ rate}=(kTH \times GaR-GaL)/\{GaR \times (1+kTH)\} \quad \text{[Mathematical expression 12]}$$

According to the equation of mathematical expression 12 described above, an actual EGR rate can be calculated based on the fresh air amounts GaL and GaR of the respective banks 2L and 2R, the intake air temperature THL before the compressor of the one bank 2L, and the intake air temperature THa. That is to say, a temperature factor that causes a difference between the left and right compressor flow rates can be reflected in the calculation formula of the EGR rate. Thereby, in the one-valve EGR control, the actual EGR rate can be calculated more accurately. Accordingly, not only the EGR rate can be easily calculated with use of the existing air flow sensors 92L and 92R, but also the calculation precision of the EGR rate can be enhanced as compared with the equation of mathematical expression 3 described above.

Further, in the present embodiment, a newest EGR rate may be calculated by using a temperature TEGR of the EGR gas and an immediately preceding EGR rate EGRO, in place of the intake air temperature before the compressor. Here, the temperature TEGR of the EGR gas is detected by EGR temperature sensors disposed in the upstream EGR passages 72L and 72R, the midstream EGR passage or the downstream EGR passages 76L and 76R. Further, the immediately preceding EGR rate EGRO is a value of the EGR rate calculated in the arithmetic process of the previous time, of the EGR rates calculated periodically by the ECU 100. Describing in more detail, first, the intake air temperature THL before the compressor of the left bank 2L can be expressed as an equation of mathematical expression 13 described as follows. The equation of mathematical expression 13 is substituted into the equation of mathematical expression 10 described above, whereby an equation of mathematical expression 14 described as follows can be obtained. Therefore, by organizing the equation of mathematical expression 14, an equation of mathematical expression 15 described as follows can be obtained.

$$THL=THa+(TEGR-THa) \times 2 \times EGRO \quad \text{[Mathematical expression 13]}$$

$$kTH=THa/\{THa+(TEGR-THa) \times 2 \times EGRO\} \quad \text{[Mathematical expression 14]}$$

$$kTH=1/\{1+(TEGR/THa-1) \times 2 \times EGRO\} \quad \text{[Mathematical expression 15]}$$

When the equation of mathematical expression 14 which is obtained as above is substituted into the equation of mathematical expression 12 described above, the newest EGR rate can be calculated based on the fresh air amounts GaL and GaR of the respective banks 2L and 2R, the temperature TEGR of the EGR gas, the EGR rate of the previous time EGRO, and the intake air temperature THa. According to this method, an effect substantially similar to the case of using the equation of mathematical expression 12 described above can also be obtained.

Further, when the calculation method of the EGR rate according to the present embodiment, and the calculation method (the equation of mathematical expression 5) of the EGR rate described in the aforementioned fourth embodiment are combined, an equation of mathematical expression 16 described as follows is obtained. According to the equation, by a combined effect of the fourth and fifth embodiments, the calculation precision of the EGR rate can be further enhanced.

$$\text{EGR rate}=(kGa \times kTH \times GaR-GaL)/\{GaR \times (1+kGa \times kTH)\} \quad \text{[Mathematical expression 16]}$$

Sixth Embodiment

Next, a sixth embodiment of the present invention will be described with reference to FIG. 11. A feature of the present embodiment lies in switching the bank in which the EGR gas is caused to flow in the one-valve EGR control based on a value of an integrated EGR gas amount. Note that the present embodiment is predicated on a configuration similar to the configuration of the aforementioned first embodiment, and explanation of the same terms and reference signs as in the first embodiment will be omitted.

In general, an EGR gas contains very small amounts of substances such as soot, tar and pitch. If these substances adhere to blades, piping and the like of the compressors 62L and 62R, the compressor flow rates may be reduced. Therefore, when the EGR gas is caused to flow exclusively in only either one of the left or right bank at the time of execution of the one-valve EGR control, the compressor flow rate is reduced early in the specific bank, and aged deterioration is likely to advance, while the one-valve EGR control is being executed for a long time period.

Therefore, in the present embodiment, the integrated EGR amounts obtained by integrating the actual flowing amounts of the EGR gas are calculated for the respective banks 2L and 2R, and the bank for use in the one-valve EGR control is determined based on the values of the integrated EGR amounts. That is to say, at the time of execution of the one-valve EGR control, the EGR valve is closed in the bank having a larger integrated EGR amount out of the banks 2L and 2R, and the EGR valve is opened in the bank having a smaller integrated EGR amount.

Describing in more detail, first of all, during execution of the one-valve EGR control, the actual EGR amount is calculated in the bank where the EGR valve is opened. When the aforementioned fourth embodiment is taken as one example, the EGR amount GaEGR in the one-valve EGR control of the left bank is calculated by an equation of mathematical expression 17 described as follows. Further, the EGR amount GaEGR in the one-valve EGR control of the right bank is calculated by an equation of mathematical expression 18 described as follows. These equations are obtained from the equations of mathematical expressions 6 and 8 described above.

$$GaEGR=kGa \times GaR-GaL \quad \text{[Mathematical expression 17]}$$

$$GaEGR=GaL/kGa-GaR \quad \text{[Mathematical expression 18]}$$

Integrated EGR amounts MEGRL and MEGRR of the respective banks 2L and 2R are calculated by integrating (a time integral) the EGR amounts GaEGR of the corresponding banks. When MEGRL>MEGRR is established at a timing at which the one-valve EGR control is started, the one-valve EGR control of the right bank is executed. Further, when MEGRL MEGRR is established, for example, the one-valve EGR control of the left bank is executed.

In the above-described explanation, the calculating method of the EGR amount is described by citing the fourth embodiment as an example, the numerators in the equations of mathematical expressions 3, 12 and 16 described in the first and fifth embodiments also represent the EGR amounts GaEGR, and therefore, these EGR amounts GaEGR may be applied to the present embodiment. Further, the timing for starting the one-valve EGR control means a timing for starting the one-valve EGR control from the state in which the EGR control is stopped, and a timing at which the EGR control is switched to the one-valve EGR control from the both-valve EGR control. Describing further, in the first and second embodiments, the start timing of the one-valve EGR control corresponds to a timing at which the EGR mode is switched to the EGR mode 1 from the EGR mode 2, and a timing at which the combustion mode is switched to the lean combustion mode from the stoichiometric combustion mode.

Further, in the present embodiment, one integrated EGR amount MEGR may be used, instead of the integrated EGR amounts MEGRL and MEGRR of the respective banks 2L and 2R. In this case, during execution of the EGR control of the left bank, the EGR amount GaEGR of the left bank is added to the integrated EGR amount MEGR, as shown in an equation of mathematical expression 19 described as follows. Further, during execution of the EGR control of the right bank, the EGR amount GaEGR of the right bank is subtracted from the integrated EGR amount MEGR as shown in an equation of mathematical expression 20 described as follows. These addition and subtraction are executed at each arithmetic process of the EGR amount GaEGR.

$$MEGR=MEGR+(kGa \times GaR-GaL) \quad \text{[Mathematical expression 19]}$$

$$MEGR=MEGR-(GaL/kGa-GaR) \quad \text{[Mathematical expression 20]}$$

At a time of starting the one-valve EGR control, the one-valve EGR control of the right bank is executed when MEGR>0 is established, that is, when the integrated EGR amount of the left bank is larger than the integrated EGR amount of the right bank. Further, for example, when MEGR≤0 is established, that is, when the integrated EGR amount of the left bank is equal to or smaller than the integrated EGR amount of the right bank, the one-valve EGR control of the left bank is executed.

[Specific Processes for Realizing Sixth Embodiment]

Next, with reference to FIG. 11, specific processes for realizing the aforementioned control will be described. FIG. 11 is a flowchart showing control executed by the ECU in the sixth embodiment of the present invention. In the routine shown in FIG. 11, it is firstly determined whether or not the target EGR rate is zero, that is, whether the EGR control is stopping, in step 500. When the determination in step 500 is established, the flow shifts to step 502, the ratio (GaL/GaR) of the fresh air amounts of the left and right banks 2L and 2R is substituted into the bank-to-bank intake air amount ratio kGa. Further, when the determination in step 500 is not established, it is determined whether or not the target EGR rate is larger than a switch determination value X in step 504. When the determination in step 504 is established, it is determined that the EGR mode is the EGR mode 2 in step 506, and the flow shifts to step 512.

When the determination in step 504 is not established, the flow shifts to step 508, and it is determined whether or not the target EGR rate is smaller than a switch determination value Y. When the determination in step 508 is established, it is determined that the EGR mode is the EGR mode 1 in step 510, and the flow shifts to step 512. When the determination in step 508 is not established, the flow shifts to step 512 without performing determination of the mode of the EGR control.

Next, in step 512, it is determined whether or not the present mode is the EGR mode 1. When the determination in step 512 is established, the flow shifts to step 514, and it is determined whether the mode in the arithmetic process of the previous time is the EGR mode 2, or whether the target EGR rate of the previous time is zero. That is to say, in steps 512 and 514, it is determined whether or not the timing is for starting the one-valve EGR control. When the determination in step 514 is established, the timing is a start timing of the one-valve EGR control, and therefore the flow shifts to step 516, where it is determined whether or not the aforementioned integrated EGR amount MEGR is a positive value.

When the determination in step 516 is established, the flow shifts to step 518, where the EGR control bank is set at "the right". That is to say, as the execution mode of the one-valve EGR control, the one-valve EGR control of the right bank is selected. When the determination in step 516 is not established, the flow shifts to step 520, and the EGR control bank is set at "the left". That is to say, as the execution mode of the one-valve EGR control, the one-valve EGR control of the left bank is selected.

Next, in step 522, it is determined whether or not the EGR control bank is "the right". When the determination in step 522 is established, the one-valve EGR control of the right bank is executed in steps 524 and 526. That is to say, in step 524, the target EGR valve lift amount of the right bank is calculated. In step 526, the actual EGR rate is calculated by the equation of mathematical expression 9 described above, and feedback control of the valve lift amount of the EGR valve 80R is performed so that the actual EGR rate corresponds to the target EGR rate. Further, in step 528, the integrated EGR amount MEGR is updated by the equation of mathematical expression 20 described above.

When the determination in step 522 is not established, the one-valve EGR control of the left bank is executed in steps 530 and 532. That is to say, in step 530, the target EGR valve lift amount of the left bank is calculated. In step 532, the actual EGR rate is calculated by the equation of mathematical expression 5 described above, and feedback control of the valve lift amount of the EGR valve 80L is performed. Further, in step 534, the integrated EGR amount MEGR is updated by the equation of mathematical expression 19 described above.

Further, when the determination in step 512 is not established, the flow shifts to step 536, and the target EGR valve lift amount for use in both the banks is calculated. Subsequently, in step 538, the both-valve EGR control is executed. Further, after the processes in steps 528, 534 and 538 are executed, the processes in steps 500 to 538 are repeated until a condition for ending the present routine is established.

As above, according to the present embodiment, the bank which is used at the time of execution of the one-valve EGR control can be properly selected based on the integrated amounts of the EGR gases which flow through the respective banks 2L and 2R. Thereby, the integrated EGR amounts of the left and right banks 2L and 2R are equalized, and the EGR gas is avoided from being caused to flow into only one of the banks exclusively. Accordingly, deterioration of the system due to the one-valve EGR control can be restrained.

Note that the present invention includes a system combining arbitrary configurations that can be combined with one another, out of the various configurations described in the aforementioned first to sixth embodiments. Further, in the aforementioned first to sixth embodiments, explanation is made with the engine 1 including the turbochargers 60L and 60R as an example. However, the present invention is not limited to this, and may be applied to a natural aspiration-type engine without including a turbocharger. Further, the turbochargers of the present invention are not limited to the turbochargers 60L and 60R, and may be configured by, for example, superchargers, electrically driven compressors or the like. Further, in the aforementioned first embodiment, the configuration in which the EGR passages of the left and right banks 2L and 2R temporarily join each other by the midstream EGR passage 74 is illustrated. However, the present invention is not limited to this, and may be applied to an internal combustion engine in which the EGR passages of the two banks are individually connected to the intake passage without joining each other.

Furthermore, in the aforementioned first embodiment and its FIG. 4, the transient control is illustrated by a control example to be performed from the time point t3 at which the valve opening action of one EGR valve 80L is started, until the time point t5 at which the opening degree restriction time period T0 elapses (that is, at which the opening degree restriction of the other EGR valve 80R is cancelled). However, the present invention is not limited to this, the transient control may be an control to be performed from the time point t3 until the time point t6 in FIG. 4 at which a opening degree of the EGR valve 80L reaches the one-valve target opening degree.

What is claimed is:

1. An EGR control method of an internal combustion engine including two banks sharing an intake passage with each other, two EGR valves that are provided respectively at the two banks, and are capable of regulating amounts of EGR gases that are recirculated from exhaust passages of the respective banks to the intake passage, in the respective banks, and a control device that individually controls the two EGR valves, wherein the control device includes an electronic control unit, a sensor system that detects operation information of the engine including at least one sensor, a processor, and memory with programs stored therein, the EGR control method comprising the steps of:

executing, by the control device both-valve EGR control that controls both opening degrees of the respective EGR valves to recirculate the EGR gases to the intake passage from the exhaust passages of the respective banks, when a request EGR amount is larger than a switch determination value;

executing by the control device one-valve EGR control that keeps one EGR valve of the respective EGR valves in an always closed state and controls an opening degree of the other EGR valve to a one-valve target opening degree in the state, when the request EGR amount is smaller than the switch determination value;

executing by the control device transient control during a time period until the one-valve EGR control is started after the both-valve EGR control is ended, when the both-valve EGR control is switched to the one-valve EGR control; and in the transient control, the one EGR valve is closed, and the other EGR valve is opened with an opening degree smaller than the one-valve target opening degree.

2. The EGR control method of an internal combustion engine according to claim 1, wherein the control device has a function of executing a stoichiometric combustion mode of performing combustion with an air-fuel ratio corresponding to a theoretical air-fuel ratio, and a lean combustion mode of performing combustion at a leaner side than the theoretical air-fuel ratio, and the both-valve EGR control is executed during the stoichiometric combustion mode, and the one-valve EGR control is executed during the lean combustion mode.

3. The EGR control method of an internal combustion engine according to claim 1, wherein in the transient control at a time of switching to the one-valve EGR control from the both-valve EGR control, a first process of closing the one EGR valve is executed, during a time period until an opening degree restriction time period set in advance elapses after the one EGR valve is closed, a second process of restricting an opening degree of the other EGR valve to a transient one-valve target opening degree that is set to be smaller than the one-valve target opening degree is executed, and when the opening degree restriction time period elapses, a third process of releasing restriction of the opening degree of the other EGR valve, and changing the opening degree of the other EGR valve to the one-valve target opening degree is executed.

4. The EGR control method of an internal combustion engine according to claim 1, wherein the two banks each includes a turbocharger for turbocharging intake air by using an exhaust gas pressure, and a wastegate valve for controlling the exhaust gas pressure that is applied to the turbocharger, and at a time of execution of the one-valve EGR control, the wastegate valve of at least one of the banks is controlled so that rotational speeds of the turbochargers of the respective banks correspond to each other.

5. The EGR control method of an internal combustion engine according to claim 1, wherein at the time of execution of the one-valve EGR control, intake air amounts of the respective banks are individually detected, and an amount of an EGR gas is calculated based on the intake air amounts of the respective banks.

6. The EGR control method of an internal combustion engine according to claim 1, wherein intake air amounts of the respective banks are respectively detected in a state in which the both-valve EGR control and the one-valve EGR control are stopped, and a bank-to-bank intake air ratio that is a ratio of the intake air amounts of the respective banks is stored in advance, and at the time of execution of the one-valve EGR control, an amount of an EGR gas is calculated based on the intake air amounts detected respectively in the respective banks, and the bank-to-bank intake air amount ratio.

7. The EGR control method of an internal combustion engine according to claim 6, wherein two kinds of bank-to-bank intake air amount ratios comprising the bank-to-bank intake air amount ratio in a natural aspiration region, and the bank-to-bank intake air amount ratio in a turbocharging region are respectively calculated and stored, and at the time of execution of the one-valve EGR control, either one of the two kinds of bank-to-bank intake air amount ratios is selected based on presence or absence of turbocharging, and the amount of the EGR gas is calculated by using the selected bank-to-bank intake air amount ratio.

8. The EGR control method of an internal combustion engine according to claim 5, wherein at the time of execution of the one-valve EGR control, a calculation value of the EGR gas amount is corrected based on at least one temperature of a temperature of the EGR gas and an intake air temperature.

9. The EGR control method of an internal combustion engine according to claim 1, wherein an integrated EGR amount obtained by integrating actual flowing amounts of the EGR gas is calculated for each of the banks, and at the time of execution of the one-valve EGR control, the EGR valve is closed in the bank where the integrated EGR amount is larger out of the two banks, and the EGR valve is driven in the bank where the integrated EGR amount is smaller.

* * * * *